United States Patent
Morita et al.

(10) Patent No.: US 7,280,104 B2
(45) Date of Patent: Oct. 9, 2007

(54) DISPLAY DRIVE CONTROL DEVICE, FOR WHICH DRIVE METHOD, ELECTRONICS DEVICE AND SEMICONDUCTOR INTEGRATED CIRCUIT

(75) Inventors: Shin Morita, Higashimurayama (JP); Goro Sakamaki, Fuchu (JP); Toshikazu Tachibana, Tachikawa (JP)

(73) Assignee: Renesas Technology Corp., Tokyo (JP)

( * ) Notice: Subject to any disclaimer, the term of this patent is extended or adjusted under 35 U.S.C. 154(b) by 642 days.

(21) Appl. No.: 10/830,080

(22) Filed: Apr. 23, 2004

(65) Prior Publication Data
US 2005/0017965 A1    Jan. 27, 2005

(30) Foreign Application Priority Data
Jul. 23, 2003  (JP)  ............... 2003-200249

(51) Int. Cl.
*G09G 5/00*  (2006.01)

(52) U.S. Cl. ...................... 345/211; 345/204

(58) Field of Classification Search ............... 345/204, 345/210, 211, 214
See application file for complete search history.

(56) References Cited

U.S. PATENT DOCUMENTS 7,079,103 B2 *    7/2006  Morita ................ 345/98

* cited by examiner

*Primary Examiner*—Richard Hjerpe
*Assistant Examiner*—Jean Lesperance
(74) *Attorney, Agent, or Firm*—Miles & Stockbridge P.C.

(57) ABSTRACT

It is aimed at being capable of easily changing a power supply startup procedure and complying with various display devices. A power supply circuit is provided between an instruction register of a liquid crystal driver and a power supply unit. The power supply unit is not directly supplied with a setting value registered to the instruction register from a microprocessor unit. The microprocessor unit writes setting values to the instruction register without need for the time axis. To turn on the power, the time is measured inside the power supply sequencer. Set values are sequentially input to the power supply unit. The instruction register should be also capable of registering an input timing.

25 Claims, 32 Drawing Sheets

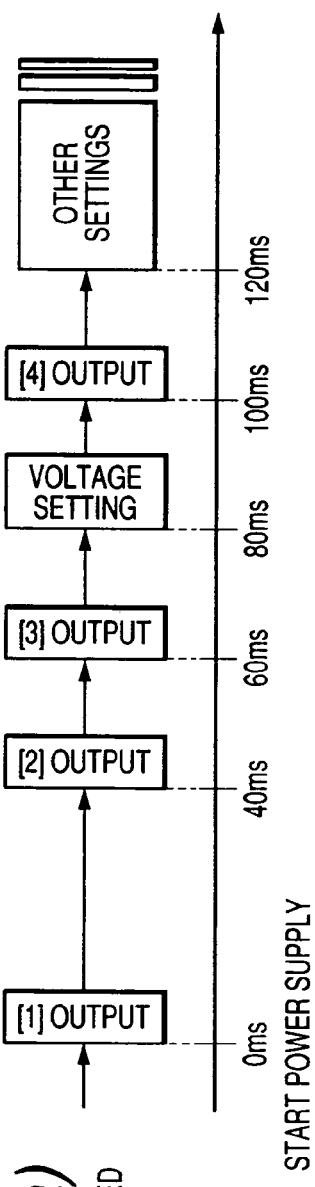
FIG. 7(a) PANEL MANUFACTURED BY X COMPANY
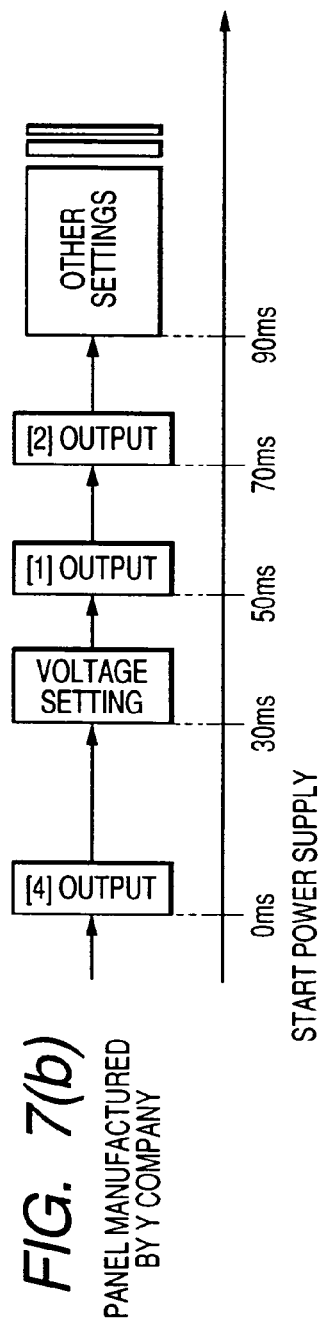
FIG. 7(b) PANEL MANUFACTURED BY Y COMPANY
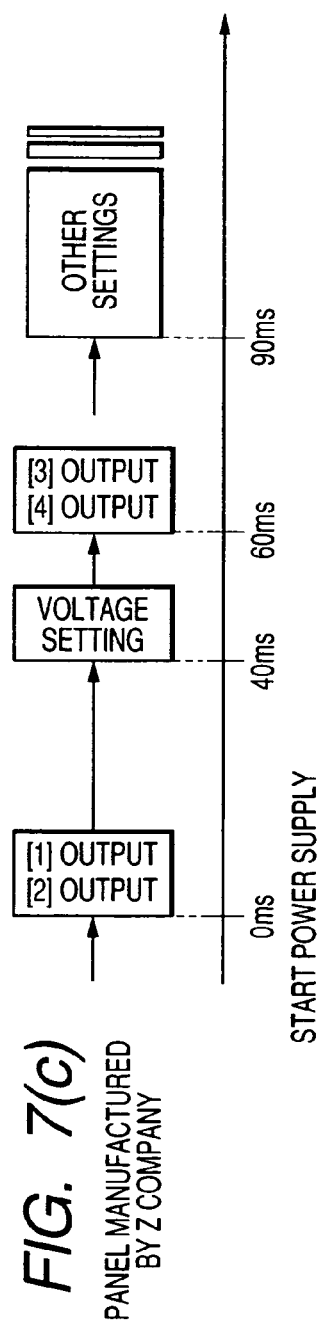
FIG. 7(c) PANEL MANUFACTURED BY Z COMPANY

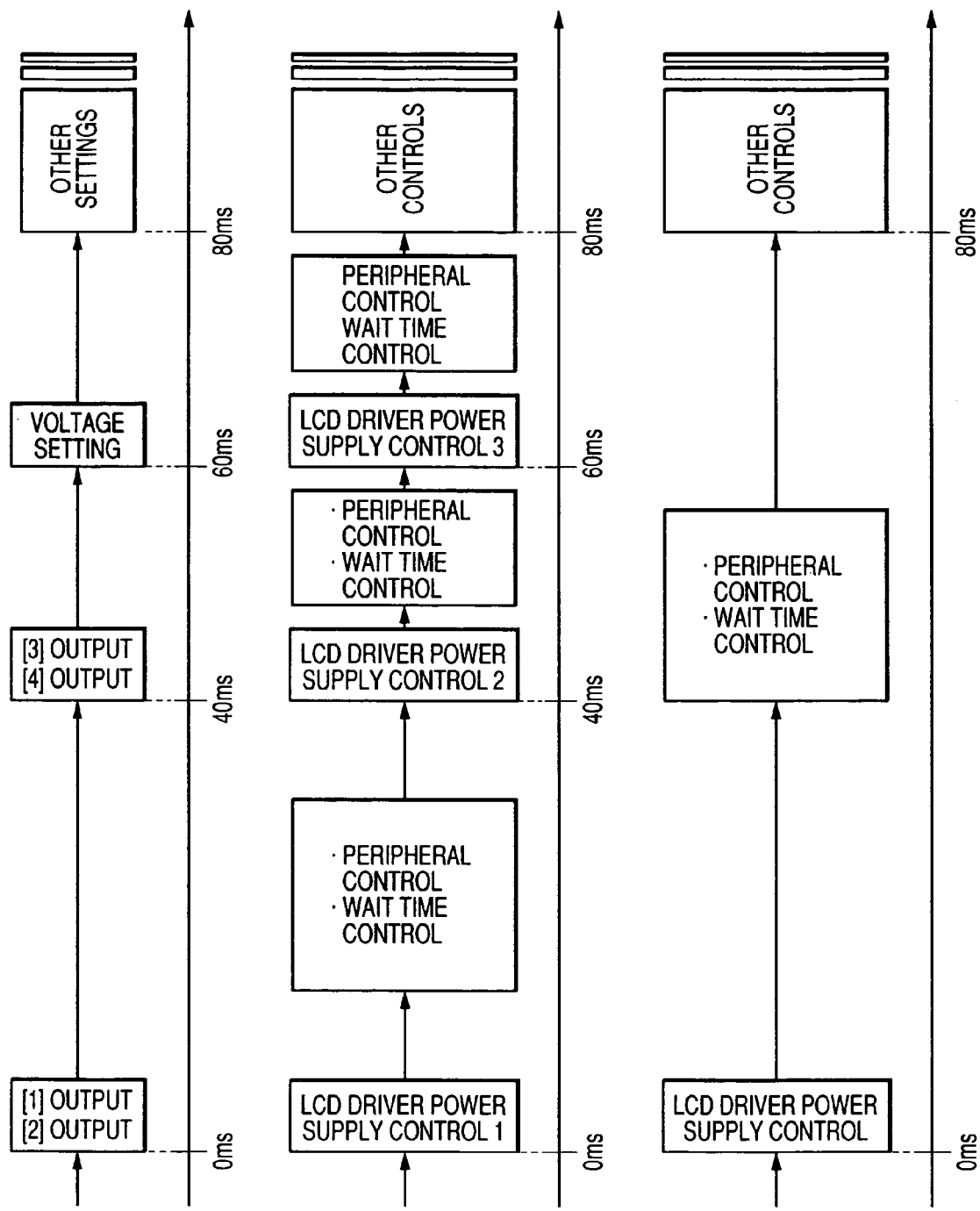

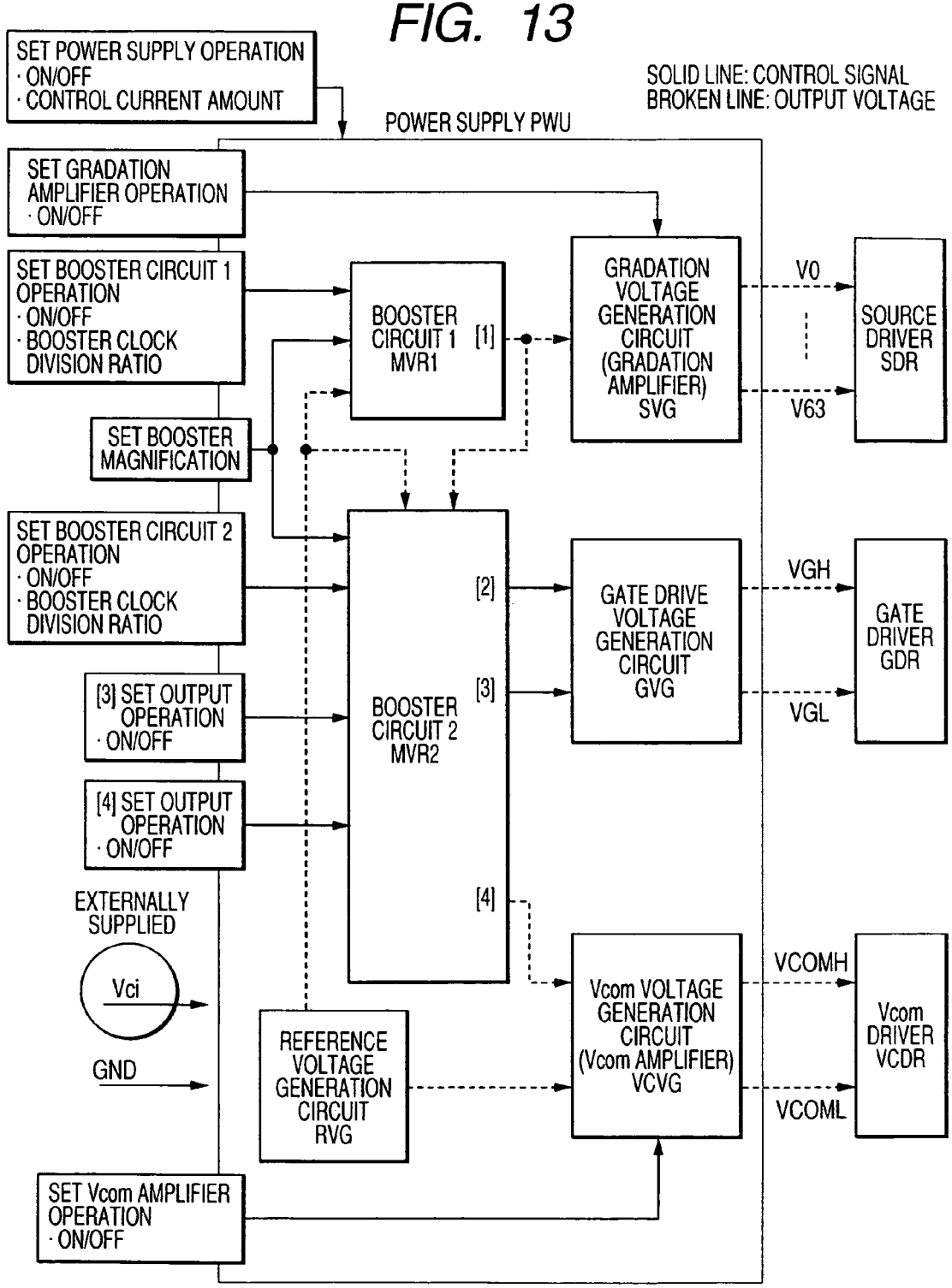

CELLULAR PHONE OPENED
= LIQUID CRYSTAL DISPLAY TURNED ON
= LIQUID CRYSTAL DRIVER TURNED ON

CELLULAR PHONE CLOSED
= LIQUID CRYSTAL DISPLAY TURNED OFF
= LIQUID CRYSTAL DRIVER TURNED OFF

COMPLETING PREPARATION FOR USING THE
SEQUENCER TO TURN OFF POWER SUPPLY

DISPLAY DRIVE CONTROL DEVICE, FOR WHICH DRIVE METHOD, ELECTRONICS DEVICE AND SEMICONDUCTOR INTEGRATED CIRCUIT

CROSS-REFERENCE TO RELATED APPLICATION

The present application claims priority from Japanese patent application JP 2003-200249 filed on Jul. 23, 2003, the content of which is hereby incorporated by reference into this application.

BACKGROUND OF THE INVENTION

The present invention relates to a display drive control device and a drive method thereof. More specifically, the present invention relates to a display drive control device having a power supply circuit which generates a plurality of voltages from a single main power supply according to a specified procedure.

A display drive control device having a so-called flat panel display device is used as a display device for electronic devices such as personal computers, television sets, cellular phones, and portable information terminals. In particular, liquid crystal displays are extensively used for cellular phones that are remarkably widespread in recent years. An electroluminescence display (organic or inorganic ELD) will be put to practical use in the near future. The following description of the present invention concerns a cellular phone using a TFT (Thin File Transistor) liquid crystal display with respect to its display drive control device (liquid crystal display drive control device) as an example. The description also applies to the other display drive control devices having the power supply circuit to generate a plurality of voltages from the main power supply. For example, the other devices include non-TFT liquid crystal display drive control devices such as the above-mentioned ELD and STN (Super Twisted Nematic), and display drive control devices using field emission displays (FEDs).

For example, a liquid crystal display drive control device requires various levels of voltages to drive its liquid crystal display (also referred to as a liquid crystal display panel or simply as a liquid crystal panel). For this reason, the liquid crystal display drive control device (also referred to as a liquid crystal controller or liquid crystal driver) generally includes a power supply circuit that generates different levels of voltages from a single main power supply.

The display device such as a liquid crystal display needs to start operating with no unwanted image or flicker. For this purpose, it is necessary to generate a plurality of voltages according to a specified sequence with a constant time interval. The sequence and the time are determined by electrical characteristics of the liquid crystal display. This procedure must be always followed when the power supply circuit is used.

SUMMARY OF THE INVENTION

Conventionally, the power supply circuit of the display drive control device is started by the software of a central processing unit (hereafter referred to as a microprocessor unit) that controls the entire cellular phone system. Accordingly, the power supply control is included as part of the entire system control. This increases system loads. Further, changing a procedure for generating voltages may change the entire system control. It has been difficult to replace the display device without changing the display drive control device such as the liquid crystal driver LSI and the like.

It is therefore an object of the present invention to provide a display drive control device and a drive method thereof capable of easily changing a power supply startup procedure, complying with various display devices, and decreasing system loads by changing a procedure of generating voltages through the use of a sequence independent of the system control.

To achieve the above-mentioned purpose, the present invention automatically starts the power supply inside a display drive control device LSI. As possible functions, the liquid crystal display drive control device LSI should be able to control time waiting and variably set a sequence of voltage occurrences and time intervals. At the startup time, the microprocessor unit can start the power supply without time control. In this manner, the system's microprocessor unit can start the power supply without time control. This decreases system loads. Further, a procedure for starting the power supply can be changed easily. The display drive control device can be applied to diverse display devices.

The present invention has the following basic constitution. That is to say, there are provided a power supply circuit and a power supply sequencer. The power supply circuit generates a plurality of voltages for displaying an image on a display device comprising a plurality of pixels disposed in a matrix. The power supply sequencer is provided between the power supply circuit and an instruction register that controls the power supply circuit. The power supply sequencer comprises a plurality of registers that register a plurality of setting values for controlling the power supply circuit. The power supply circuit is controlled to generate voltages needed for the display device based on setting values registered to the registers in the power supply sequencer.

The present invention is not limited to the above-mentioned constitution and the other constitutions as set forth in the embodiments to be described later. It is further understood by those skilled in the art that various changes and modifications may be made in the present invention without departing from the spirit and scope thereof.

BRIEF DESCRIPTION OF THE DRAWINGS

FIG. 7 is an explanatory diagram exemplifying setup flows in cellular phones using liquid crystal panels for turning on the power supply;

FIG. 8 is an explanatory diagram exemplifying power supply control flows viewed from the microprocessor unit;

FIG. 9 is an explanatory diagram showing a microprocessor unit's control flow of time control concerning liquid crystal driver's power supply setup performed in the liquid crystal driver LSI;

FIG. 13 is an explanatory diagram showing a flow of control signals between drivers for the power supply circuit and the liquid crystal panel to be controlled by a power supply sequencer showing an embodiment of the present invention;

DETAILED DESCRIPTION OF THE PREFERRED EMBODIMENTS

The following describes embodiments of the present invention applied to a cellular phone using the liquid crystal display as a display device in comparison with the art previously examined by the inventors. First, we will describe a power supply of the liquid crystal driver to be controlled by the power supply sequencer according to the present invention, and then the power control and effectiveness of the power supply sequencer. An embodiment is presented to describe the configuration of the power supply sequencer and a sequence to start and stop the power supply using the sequencer.

Figure 1A:
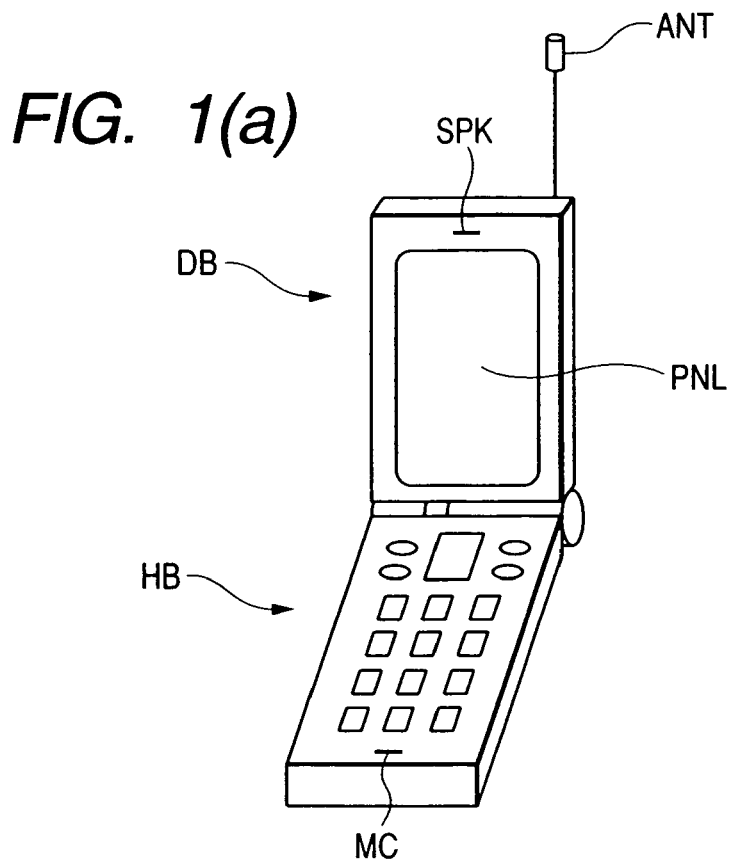
FIG. 1 is an explanatory diagram showing an ordinary cellular phone as an example of electronic devices to which the present invention is to be applied.
Figure 1B:
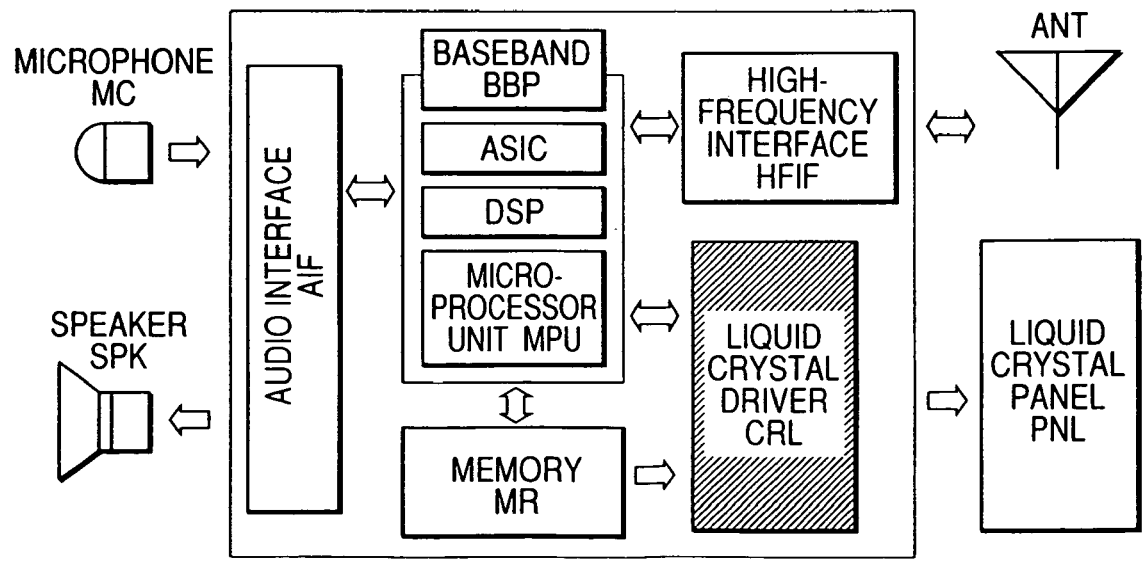

FIG. 1 is an explanatory diagram showing an ordinary cellular phone as an example of electronic devices to which the present invention is to be applied. FIG. 1(a) is an external view. FIG. 1(b) is a block diagram of the system configuration. As shown in FIG. 1(a), the cellular phone comprises a body section HB and a display section DB and is foldable at a hinge HNG. The surface of the body section HB is provided with various operation keys including a numeric keypad and function keys. The body section HB contains an LSI, a printed circuit board, a power supply circuit, and a power supply (battery) constituting the system. A microphone MC is attached to part of the surface. The display section DB is mounted with a liquid crystal display (liquid crystal panel) PNL and is provided with a speaker SPK. An antenna ANT is attached to the display section DB in FIG. 1. The antenna may be attached to the body section HB or may be contained in the display section DB or the body section HB. Further, one or more cameras, though not shown, may be mounted on part of the display section DB or the body section HB.

According to the configuration in FIG. 1(b), the system comprises an audio interface AIF, a high frequency interface HFIF, a baseband processor BBP, and memory MR. The audio interface AIF receives audio data from the microphone MC and outputs audio data to the speaker SPK. The high frequency interface HFIF interchanges signals with the antenna ANT. The memory contains nonvolatile memory and volatile memory. The nonvolatile memory such as flash memory stores not only a control program for the entire cellular phone system including display control, but also control data. The nonvolatile memory such as SRAM is used as a work area for the baseband processor BBP and interchanges data with the central processing unit to store or output that data. The baseband process or BBP comprises ASICs (application specific integrated circuits), an audio signal processing circuit DSP (Digital Signal Processor), and an MPU (microprocessor unit). The ASIC provides a custom function (user logic). The audio signal processing circuit DSP processes audio signals and the like. The microprocessor unit functions as a system controller that provides control for generation and display of baseband signals and for the entire system. The baseband processor BBP controls the entire cellular phone system. Based on commands received from the microprocessor unit, a liquid crystal driver CRL (liquid crystal display drive control device) drives a liquid crystal panel PNL to display data on a screen.

Figure 2:
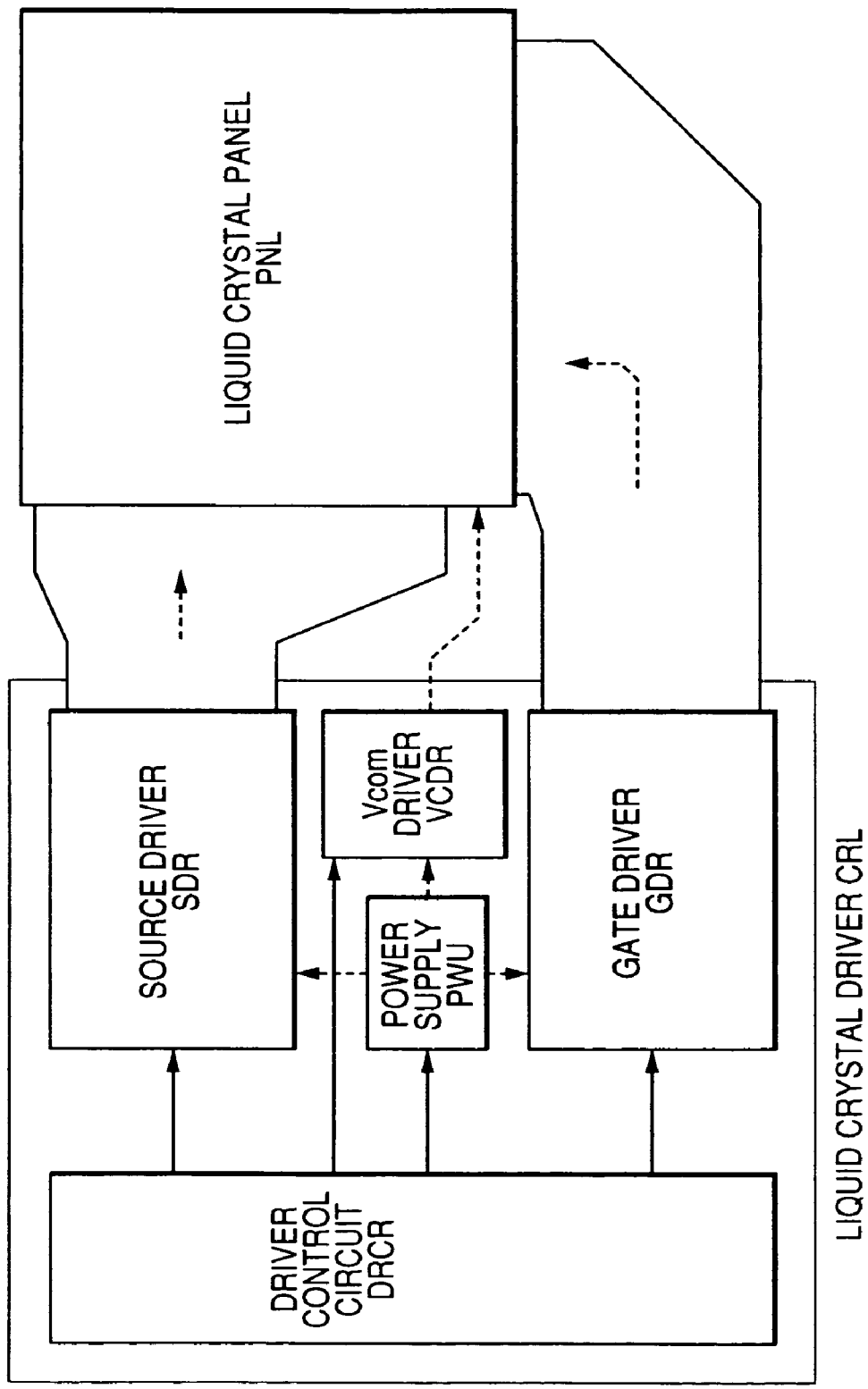
FIG. 2 is a block diagram schematically showing a configuration example of a liquid crystal driver in FIG. 1.

FIG. 2 is a block diagram schematically showing a configuration example of a liquid crystal driver in FIG. 1. The liquid crystal driver CRL comprises a source driver SDR, a gate driver GDR, a common electrode driver (Vcom driver) VCDR, a power supply unit PWU, and a driver control circuit DRCR to control these functional parts.

Figure 3A:
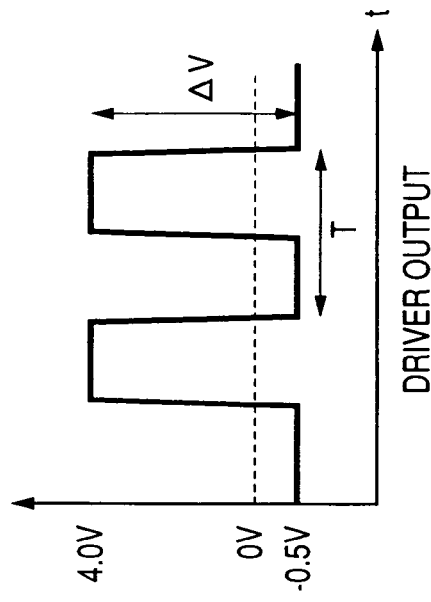
FIG. 3 shows examples of outputs from functional parts constituting the liquid crystal driver in FIG. 2.
Figure 3B:
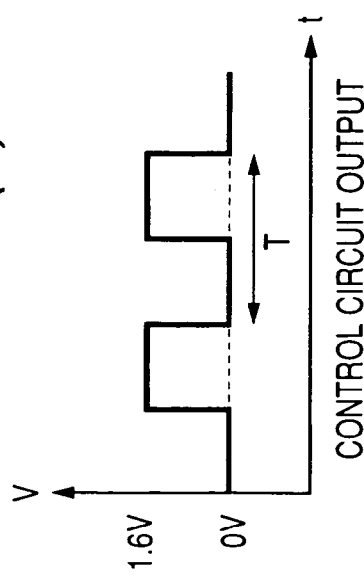
Figure 3C:
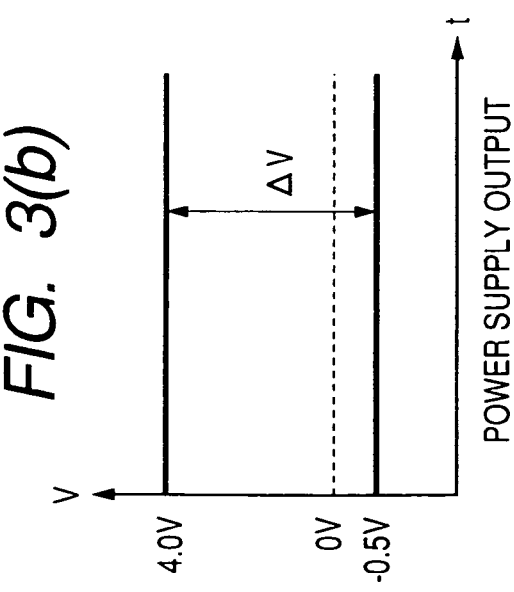

FIG. 3 shows examples of outputs from the functional parts constituting the liquid crystal driver in FIG. 2. FIG. 3(a) shows a timing to change the voltage level of driver output based on a timing signal (0 V→1.6 V) output from the driver control circuit DRCR. The power supply unit PWU generates voltage level ΔV (−1.5←→4.0 V) of driver output as shown in FIG. 3(b). A panel drive voltage waveform synchronizes with the timing signal output from the driver control circuit DRCR. Voltage ΔV from the power supply unit PWU is output in the form of a driver output voltage as shown in FIG. 3(c) to the drivers SDR, GDR, and VCDR.

Figure 4:
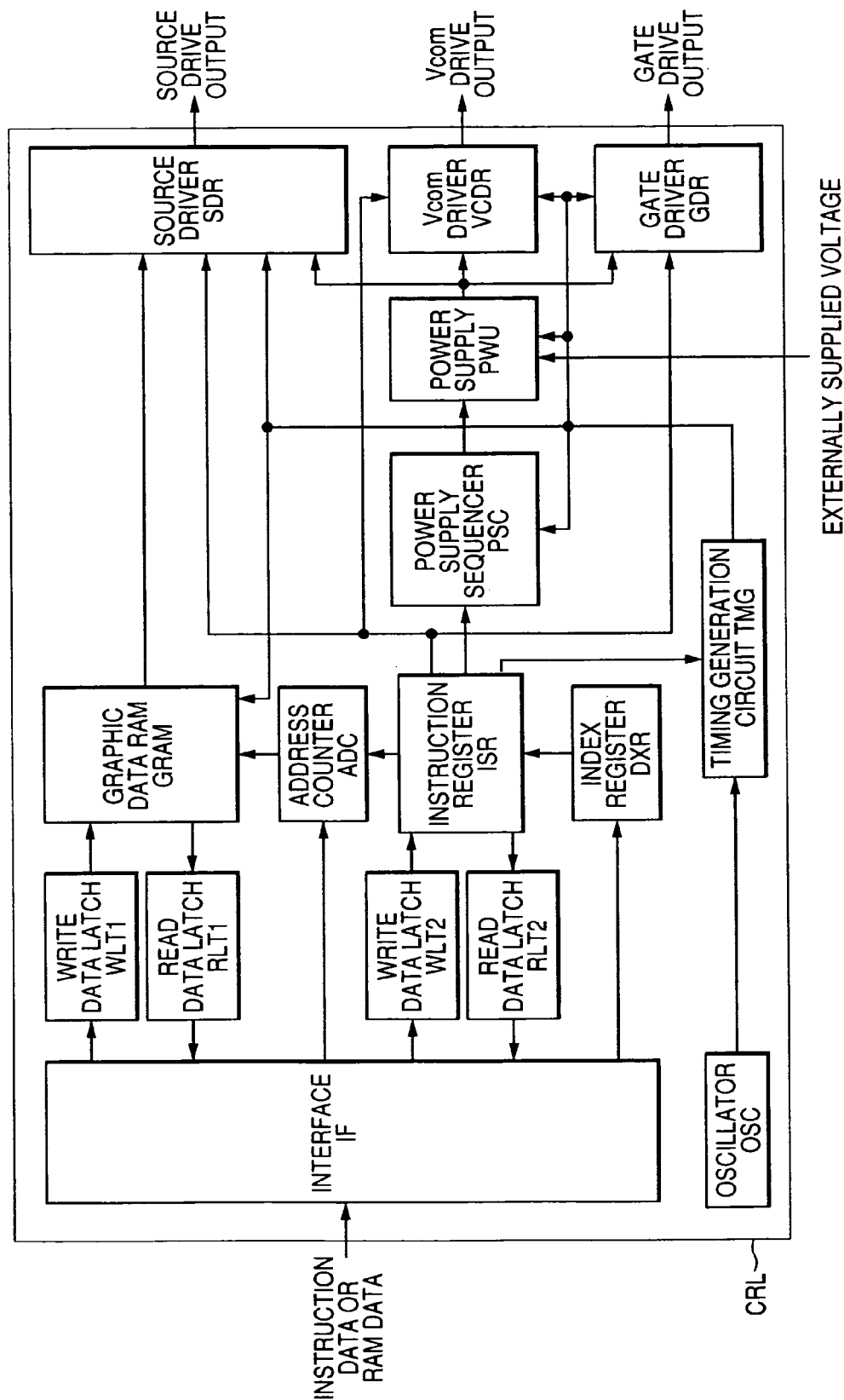
FIG. 4 is a block diagram showing in detail a configuration example of the liquid crystal driver in FIG. 2.

FIG. 4 is a block diagram showing in detail a configuration example of the liquid crystal driver in FIG. 2. The liquid crystal driver CRL comprises an interface IF, GRAM (graphics RAM), a write data latch WLT1, a read data latch WLT1, an address counter ADC, an instruction register ISR, a read data latch WLT2, an index register DXR, a reference timing frequency signal oscillator OSC, and a timing generation circuit. The interface IF incorporates various instruction data output from the microprocessor unit MPU of the baseband processor BBP in FIG. (b) and data from the memory MR (RAM). The GRAM stores display data. The write data latch WLT1 writes or reads data from the interface IF. The write data latch WLT2 reads or writes instruction data to the interface IF. The timing generation circuit TMG generates a timing signal as a basis for liquid crystal driver CRL operations based on the reference timing frequency signal oscillator OSC.

The instruction data stored in the instruction register ISR is supplied to the source driver SDR, the gate driver GDR, and the common electrode driver (VCOM driver or Vcom driver in FIG. 4). The instruction data is also supplied to the timing generation circuit TMG and the power supply sequencer PSC. The power supply sequencer PSC controls the power supply unit PWU in accordance with instruction data output from the instruction register ISR.

The driver control circuit in FIG. 2 may, but not limited to, include the interface IF, the GRAM (graphics RAM) to store display data, the write data latch WLT1, the read data latch WLT1, the address counter ADC, the instruction register ISR, the write data latch WLT2, the read data latch WLT2, the index register DXR, the reference timing frequency signal oscillator OSC, the timing generation circuit TMG, and the power supply sequencer PSC in FIG. 4.

The liquid crystal driver CRL in FIG. 4 may, but not limited to, be fabricated on one semiconductor substrate such as silicon single crystal. This allows the I/O buffer and the like to be shared, making it possible to decrease external parts and a total area for the liquid crystal driver CRL. Further, the liquid crystal driver CRL in FIG. 4 maybe divided into a portion comprising the power supply unit PWU, the source driver SDR, the Vcom driver VCDR, and the gate driver GDR and the other portion. Each portion may be fabricated on a single semiconductor substrate. This eliminates a high breakdown voltage process from the control logic section during the manufacturing process, thus decreasing costs. The power supply sequencer PSC may belong to either portion. Moreover, the liquid crystal driver CRL in FIG. 4 maybe divided into a portion only comprising the power supply unit PWU and the other portion. Each portion may be fabricated on a single semiconductor substrate. In this manner, various liquid crystal panels PNL can share the power supply unit. The remaining portion can be used for the various liquid crystal panels PNL. The power supply sequencer PSC may belong to either portion. Moreover, the liquid crystal driver CRL in FIG. 4 may be divided into a portion only comprising the gate driver GDR and the other portion. Each portion may be fabricated on a single semiconductor substrate. In this manner, the gate driver GDR can be used in accordance with the liquid crystal panel PNL. It is possible to eliminate an area for the gate driver GDR that may need to be formed on a specific type of liquid crystal panel PNL. In this case, the power supply sequencer PSC must belong to the portion that does not include the gate driver GDR. When the power supply sequencer PSC belongs to the portion that contains the gate driver GDR, another liquid crystal driver CRL is unusable if it is incompatible with the power supply sequencer PSC.

Figure 5:
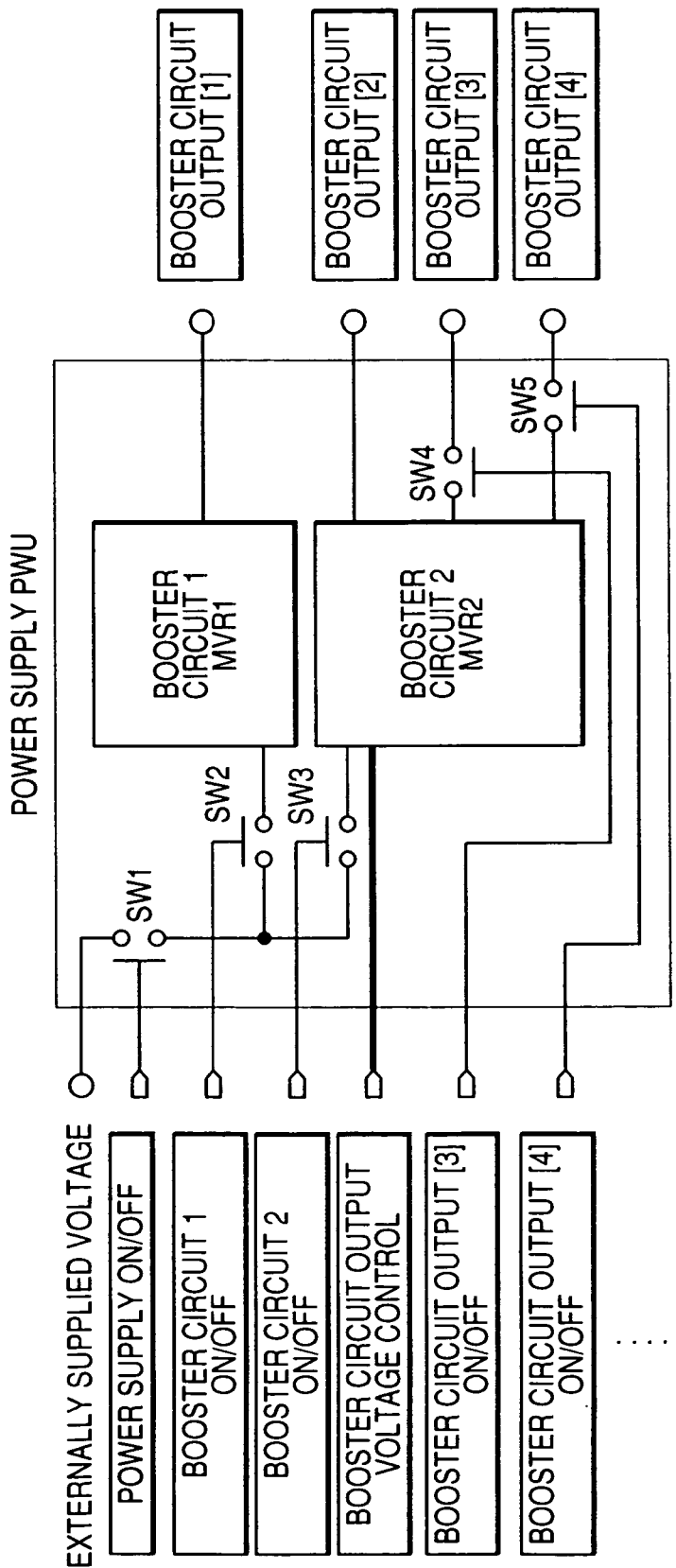
FIG. 5 is a block diagram showing a configuration example of a power supply in FIG. 4.

FIG. 5 is a block diagram showing a configuration example of a power supply in FIG. 4. The power supply unit PWU largely comprises two blocks. The power supply unit PWU has an externally supplied voltage input, a power ON/OFF input, a booster circuit 1 ON/OFF input, a booster circuit 2 ON/OFF input, booster circuit output [3] ON/OFF input, a booster circuit output [4] ON/OFF input, and a booster circuit output voltage control input. The booster circuit 1 (MVR1) has one output [1]. The booster circuit 2 (MVR2) has three outputs [2], [3], and [4]. The power supply unit PWU has a switch SW1 to be able to cause two states, i.e., a power-on state (start state) and a power-off state (stop state). Output voltage levels depend on the power-on and power-off states. Further, there are provided switches SW2, SW3, SW4, and SW5 for each block and output. The power supply is capable of not only the power-on and power-off states, but also a mixture of these states (transient state).

According to the configuration in FIG. 5, the booster circuit 1 (MVR1) has the switch SW2 to turn on or off the booster circuit 1. The booster circuit 2 (MVR2) has the switch SW3 to turn on or off the booster circuit 2. Further, the booster circuit output 3 has the switch SW4 to turn on or off the booster circuit output [3]. The booster circuit output 4 has the switch SW5 to turn on or off the booster circuit output [4]. Further, a control signal to change output voltages in addition to the above-mentioned on/off-states may be provided. The example of FIG. 5 uses a booster circuit output voltage control signal. This signal controls the magnitude of voltages for the booster circuit output [2] and the booster circuit output [3] from the booster circuit 2 (MVR2).

Figure 6:
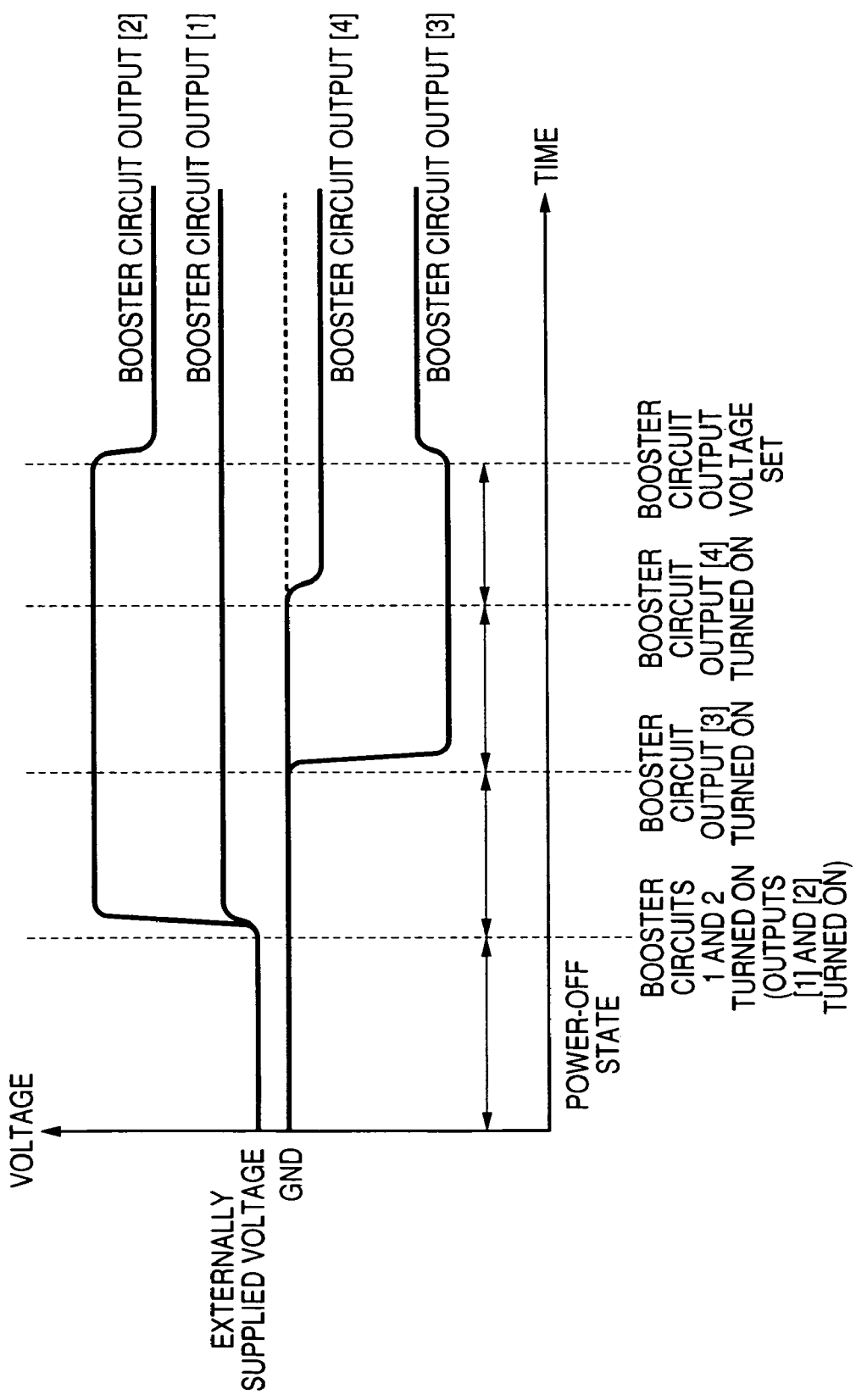
FIG. 6 is an explanatory diagram showing output changes due to startup of a power supply circuit in FIG. 5.

FIG. 6 is an explanatory diagram showing output changes due to startup of a power supply circuit in FIG. 5. In FIG. 6, the abscissa indicates the time, and the ordinate indicates the voltage (relative value). FIG. 6 shows waveforms (voltage value changes) of the booster circuit outputs [1] through [4] based on inputs of the control signals on the left in FIG. 5, i.e., the power ON/OFF, the booster circuit 1 ON/OFF, the booster circuit 2 ON/OFF, the booster circuit output voltage control, the booster circuit output [3] ON/OFF, the booster circuit output [4] ON/OFF, and soon. The booster circuit outputs [1] through [4] result from operations of the switches SW1 through SW5, the booster circuit 1 (MVR1), and the booster circuit 2 (MVR2)

When the power ON/OFF control signal indicates the power-off state, the booster circuit outputs [1] and [2] indicate the same voltage level as the externally supplied voltage. At this time, the booster circuit outputs [3] and [4] indicate the same voltage level as ground potential GND. From this state, the control signals booster circuit 1 ON/OFF and booster circuit 2 ON/OFF change to booster circuit 1 ON and booster circuit 2 ON, respectively. The booster circuit output [1] and the booster circuit output [2] rise from the externally supplied voltage to a voltage level as shown in FIG. 6.

Thereafter, the control signals booster circuit outputs [3] ON/OFF and [4] ON/OFF sequentially change to booster circuit outputs [3] ON and [4] ON. At this time, the booster circuit outputs [3] and [4] fall from the ground potential GND to a voltage level as shown in FIG. 6. The booster circuit output voltage setting of the control signal, i.e., booster circuit output voltage control, adjusts levels of the booster circuit outputs [2] and [3].

In this manner, a plurality of voltage outputs can be individually controlled in terms of on/off-states and voltage levels. Turning the power on or off requires all the control signal settings.

As mentioned above, the power-on/off control requires all the settings. The sequence and the timing are important for the settings, especially for the power-on state. Turning on the liquid crystal driver is macroscopically equivalent to displaying a picture (image) on the liquid crystal panel. The liquid crystal panel performs display operations based on a control signal output from the liquid crystal driver (liquid crystal drive controller). Obviously, an output from the power supply circuit, i.e., a source of the control signal, closely relates to the image quality of displays on the liquid crystal panel. In order to clearly display a picture with no flicker on the screen when the power is on, important factors are the sequence and the timing of settings for starting the power supply.

FIG. 7 is an explanatory diagram exemplifying setup flows in cellular phones using liquid crystal panels for turning on the power supply. FIG. 7(a) outlines a setup flow of X company, 7(b) that of Y company, and 7(c) that of Z company. In FIG. 7, [1] output through [4] output signify turning on the booster circuit outputs [1] through [4] in FIGS. 5 and 6 above. The voltage setting in FIG. 7 signifies using the booster circuit output voltage setting in FIG. 6 to control output voltages from the booster circuit outputs [2] and [3]. The step of other settings signifies settings of drivers other than the power supply.

As seen from FIGS. 7(a), 7(b), and 7(c), different liquid crystal panel manufacturers use different sequences and timings for turning on the booster circuit outputs [1] through [4]. That is to say, clearly displaying a picture requires changing the power supply setup flow in accordance with electrical characteristics of the combined liquid crystal panel.

FIG. 8 is an explanatory diagram exemplifying power supply control flows viewed from the microprocessor unit. FIG. 8(a) shows a liquid crystal driver setup flow. FIG. 8(b) shows a microprocessor unit control flow. In FIG. 8(a), [1] output through [4] output have the same meaning as that in FIG. 7. The microprocessor unit controls a power supply setup flow of the liquid crystal driver. As shown in FIG. 8, the microprocessor unit performs control in the following order: power supply control 1 of liquid crystal panel driver (LCD driver in FIG. 8); peripheral control and wait time control; LCD driver power supply control 2; peripheral control and wait time control; LCD driver power supply control 3; peripheral control and wait time control; and other controls. In this manner, the microprocessor unit controls peripheral devices (communication device, audio processing device, and the like) other than the liquid crystal driver during the wait time for power supply setup.

Let us consider changing (replacing) only the liquid crystal panel of the cellular phone system. Changing the liquid crystal panel obviously changes the power supply setup flow for the liquid crystal driver in accordance with the changed liquid crystal panel. This means changing the control flow for the microprocessor unit. When a change is made to the control portion of the liquid crystal driver in the control flow for the microprocessor unit, this change also necessitates changes in the control of the peripheral devices other than the liquid crystal driver. The changes must be examined and checked in detail. That is to say, changing the liquid crystal panel inevitably changes the entire system control. This becomes a large hindrance to manufacturers that demand multivenders of liquid crystal panels (diversifying venders).

To sum up the above-mentioned description, a fundamental problem is that the power supply setting requires the time control. The time control is indispensable in consideration for electrical or structural characteristics of the power supply circuit or for compatibility with the liquid crystal panel. The next possible problem is that the time control is exclusively submitted to the microprocessor unit. A single control flow contains a plurality of time controls, making a control change difficult. To solve these problems, the present invention aims at using the LSI circuit of the driver to independently perform the time control for power supply setting of the liquid crystal driver.

FIG. 9 is an explanatory diagram showing a microprocessor unit's control flow of time control concerning the liquid crystal driver's power supply setup performed in the liquid crystal driver LSI. When the power supply starts, the control flow in FIG. 8(b) is measured at small time intervals. By contrast, the control flow in FIG. 9 first configures several settings in batch at the step of LCD driver power supply control. Subsequently, the power supply automatically starts during a wait time. In this manner, the microprocessor unit, especially when it is used for the cellular phone, is freed from the time control associated with the power supply setup for the liquid crystal driver. If the liquid crystal panel is changed, it is only necessary to change the initial setup values in the control flow. The control flow can be easily changed without affecting control of the other peripheral devices. Further, it is possible to easily entrust multivenders with liquid crystal panels used for cellular phones.

Figure 10:
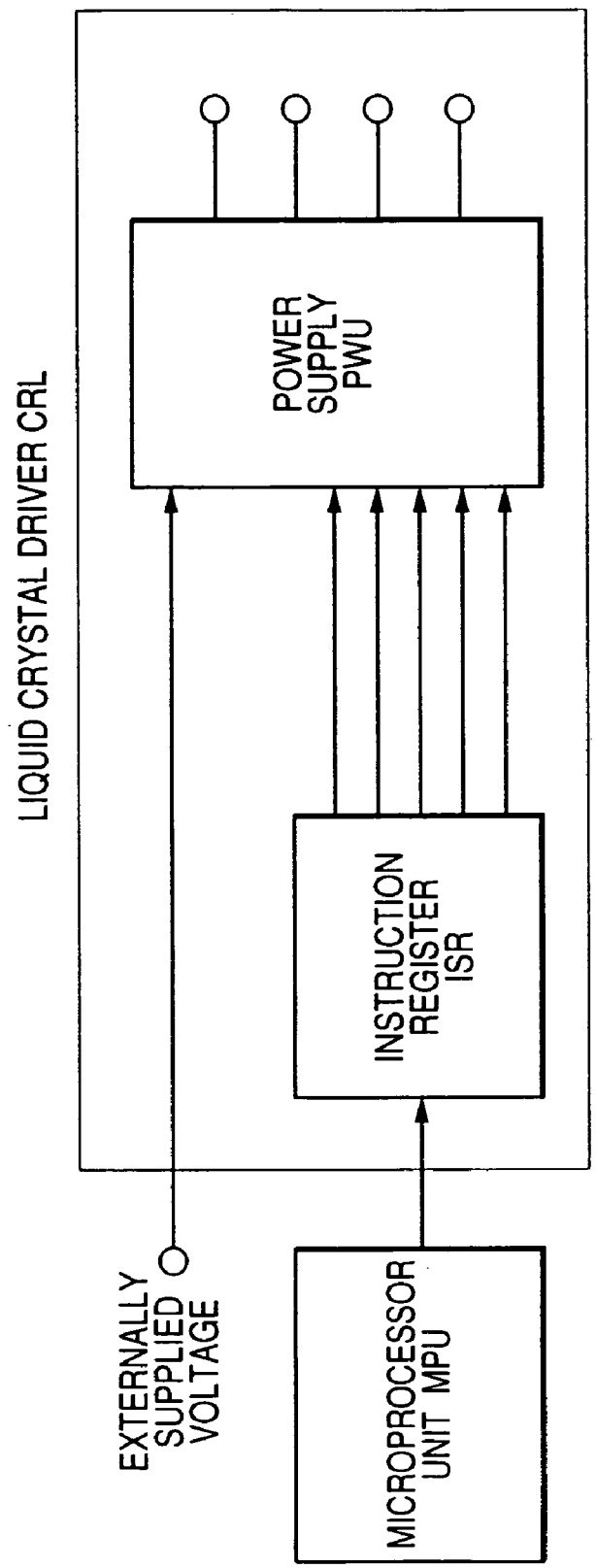
FIG. 10 is a circuit configuration diagram of a liquid crystal driver previously examined by the inventors so as to explain a new configuration of the present invention by comparison.

FIG. 10 is a circuit configuration diagram of a liquid crystal driver previously examined by the inventors so as to explain a new configuration of the present invention by comparison. The liquid crystal driver has the instruction register ISR that stores setup values to control operations of the driver itself. The liquid crystal driver operates according to the setting values written to the instruction register ISR. The microprocessor unit MPU writes a setting value to the instruction register ISR to control operations of the power supply unit PWU. The conventional circuit configuration uses setting values written to the instruction register ISR to directly control on/off or output states of the blocks in the power supply unit PWU. For this reason, the power supply unit PWU starts at just the timing when the microprocessor unit writes a setting value to the instruction register ISR. The microprocessor unit must perform the time control for a power-on sequence.

Figure 11:
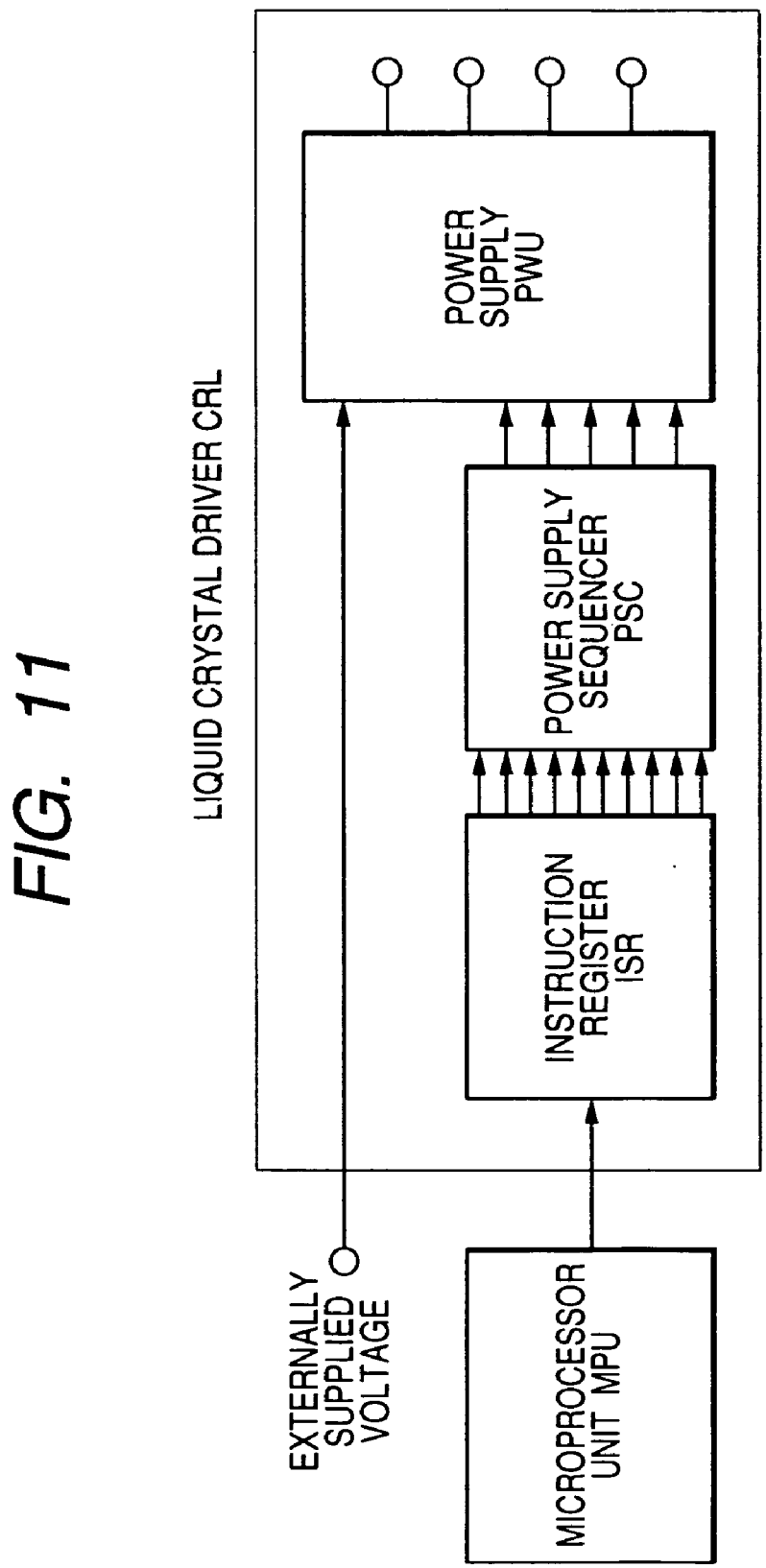
FIG. 11 is a configuration diagram exemplifying a basic circuit of the liquid crystal driver according to the present invention.

FIG. 11 is a configuration diagram exemplifying a basic circuit of the liquid crystal driver according to the present invention. In FIG. 11, the reference symbol PSC denotes a power supply sequencer. The other constituent elements are the same as those in FIG. 10. This configuration example provides the power supply sequencer PSC between the instruction register ISR of the liquid crystal driver CRL and the power supply unit PWU. The power supply unit PWU is not directly supplied with a setting value assigned to the instruction register ISR from the microprocessor unit. Accordingly, the microprocessor unit MPU can write setting values to the instruction register ISR without need for the time axis. To turn on the power, the time is measured inside the power supply sequencer PSC. Set values are sequentially input to the power supply unit PWU. The instruction register ISR should be also capable of registering an input timing.

Figure 12:
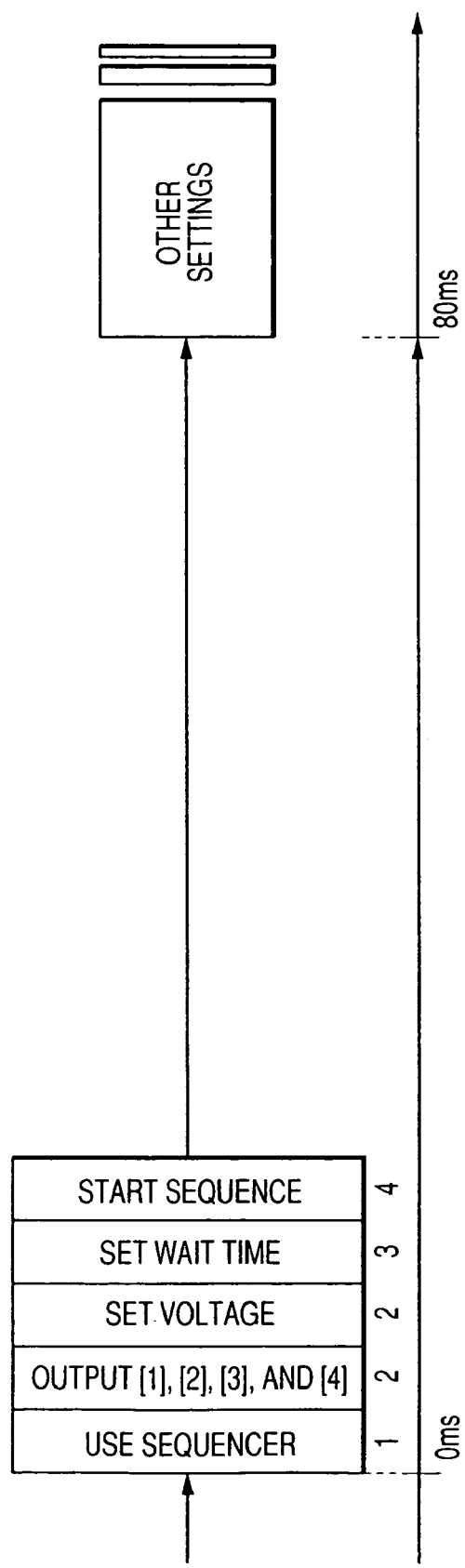
FIG. 12 is an explanatory diagram showing a setup flow of the liquid crystal driver according to the present invention.

FIG. 12 is an explanatory diagram showing a setup flow of the liquid crystal driver according to the present invention. The setup flow of the conventional liquid crystal driver is already shown in FIG. 8(a). At step 1, the present invention using the power supply sequencer enables a mode to use the sequencer. At step 2, the liquid crystal driver specifies on/off-states and setup voltages for outputs [1], [2], [3], and [4] of the power supply as described in FIG. 6. Then, at step 3, the liquid crystal driver specifies await time to enable the setting values at step 2 in the driver LSI. At step 4, the liquid crystal driver issues a Start Sequence command. The microprocessor unit MPU follows the control flow as described in FIG. 9 to set the instruction register. This is the only control needed for the power supply setup.

FIG. 13 is an explanatory diagram showing a flow of control signals between drivers for the power supply circuit and the liquid crystal panel to be controlled by a power supply sequencer showing an embodiment of the present invention. In FIG. 13, the solid line represents a control signal, and the broken line represents an output voltage. Booster circuit output [1] corresponds to the liquid crystal drive voltage. Booster circuit output [2] corresponds to the gate drive voltage at High. Booster circuit output [3] corresponds to the gate drive voltage at Low. Booster circuit output [4] corresponds to the common electrode voltage at Low.

The following control signals are provided to: turn on or off operations of a gradation voltage generation circuit (gradation amplifier) SVG for the source driver SDR; turn on or off operations of the booster circuit 1 (MVR1) and set a booster clock's division ratio; turn on or off operations of the booster circuit 1 (MVR1) and set a booster clock's division ratio; set a booster magnification; turn on or off [3] output operations; turn on or off [4] output operations; and turn on or off operations of a Vcom voltage generation circuit (Vcom amplifier) VCVG for the Vcom driver. The reference symbol Vci represents an externally supplied power supply voltage. The reference symbol GND represents a ground potential. The control signals include those for turning on or off power supply operations and controlling the magnitude of voltages and currents as well as the above-mentioned control signals for changing the on/off-states.

The booster circuit 1 (MVR1) and the booster circuit 2 (MVR2) output the above-mentioned voltages [1], [2], [3], and [4] based on the control signals and the output voltage from the reference voltage generation circuit RVG as mentioned above. The output voltage from the reference voltage generation circuit RVG is also supplied to the Vcom voltage generation circuit (Vcom amplifier) VCVG for the Vcom driver. The [1] voltage output from the booster circuit 1 (MVR1) is supplied to the gradation voltage generation circuit (gradation amplifier) SVG for the source driver SDR and to the booster circuit 2 (MVR2). The [2] and [3] voltage outputs are output to the gate drive voltage generation circuit GVG for the gate driver GDR. The [4] voltage output is supplied to the Vcom voltage generation circuit (Vcom amplifier) VCVG for the [4] Vcom driver.

Figure 14A:
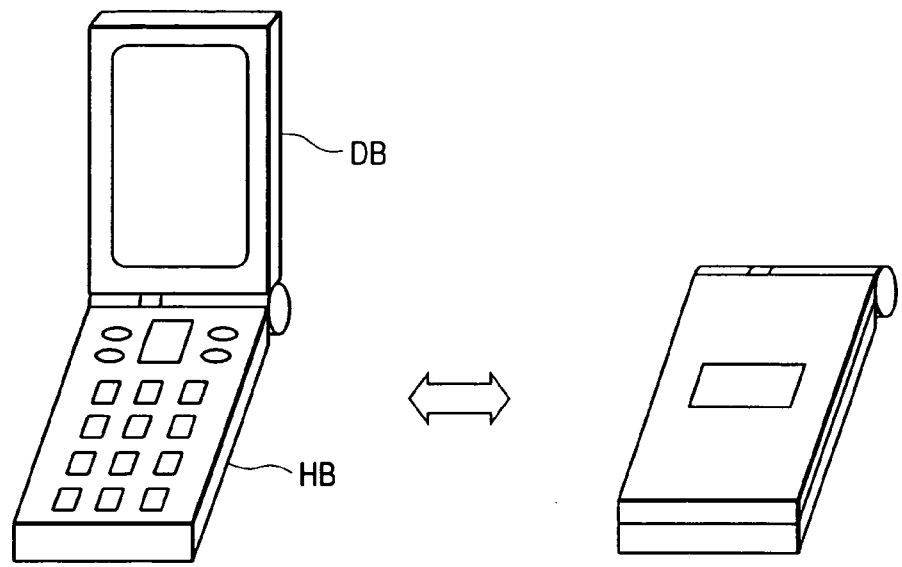
FIG. 14 is an explanatory diagram showing relationship between output voltages from booster circuits in power-on/off states.
Figure 14B:
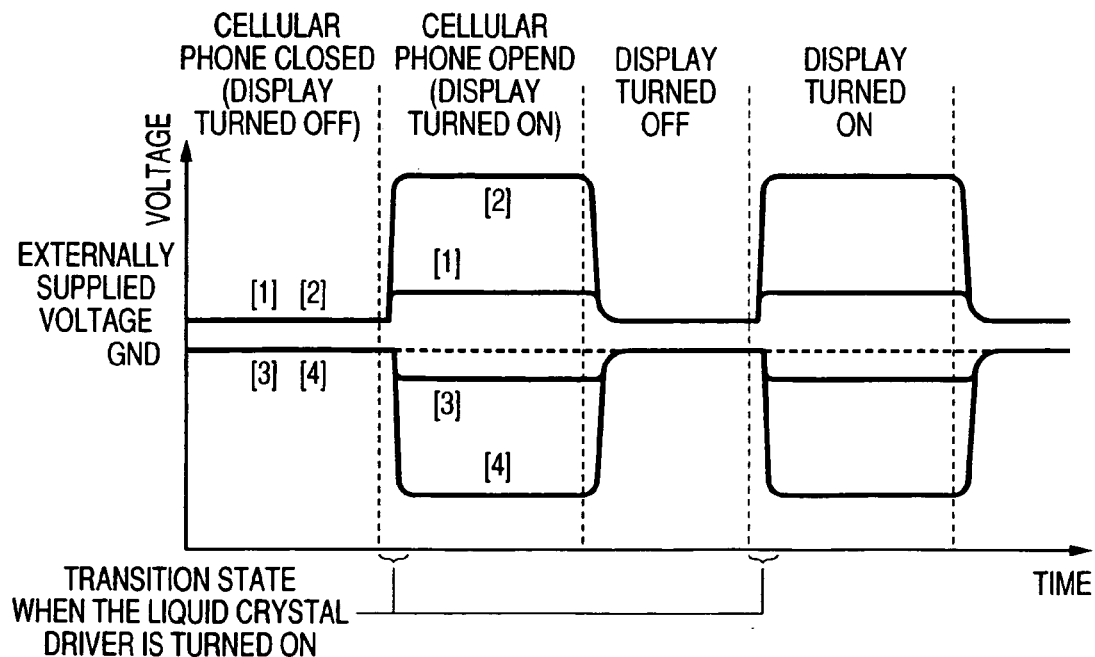

FIG. 14 is an explanatory diagram showing relationship between output voltages from the booster circuits in power-on/off states. FIG. 14(a) is a pattern diagram showing an operation example of turning on or off the power of the cellular phone. FIG. 14(b) is a waveform diagram showing changes of output voltages from the booster circuits in accordance with power-on/off operations of the cellular phone. When the display section DB of the cellular phone is opened from the body section HB in FIG. 14(a), the display of the liquid crystal panel turns on, and the liquid crystal driver turns on. When the display section DB is closed (folded), the display of the liquid crystal panel turns off, and the liquid crystal driver turns off. The voltage outputs [1] through [4] are generated from the above-mentioned booster circuits 1 and 2.

In FIG. 14(b), when the display section DB and the body section HB are closed, the output voltages [1] and [2] are equivalent to the externally supplied voltage Vci. The output voltages [3] and [4] are equivalent to the ground potential GND. At this time, the display turns off. When the display section DB is opened from the body section HB, the voltage outputs [1] through [4] change to the potentials as shown in FIG. 14(b). At this time, the display turns on. A slope of the rising edge for each voltage output indicates a transient state for the liquid crystal driver to be turned on.

Figure 15:
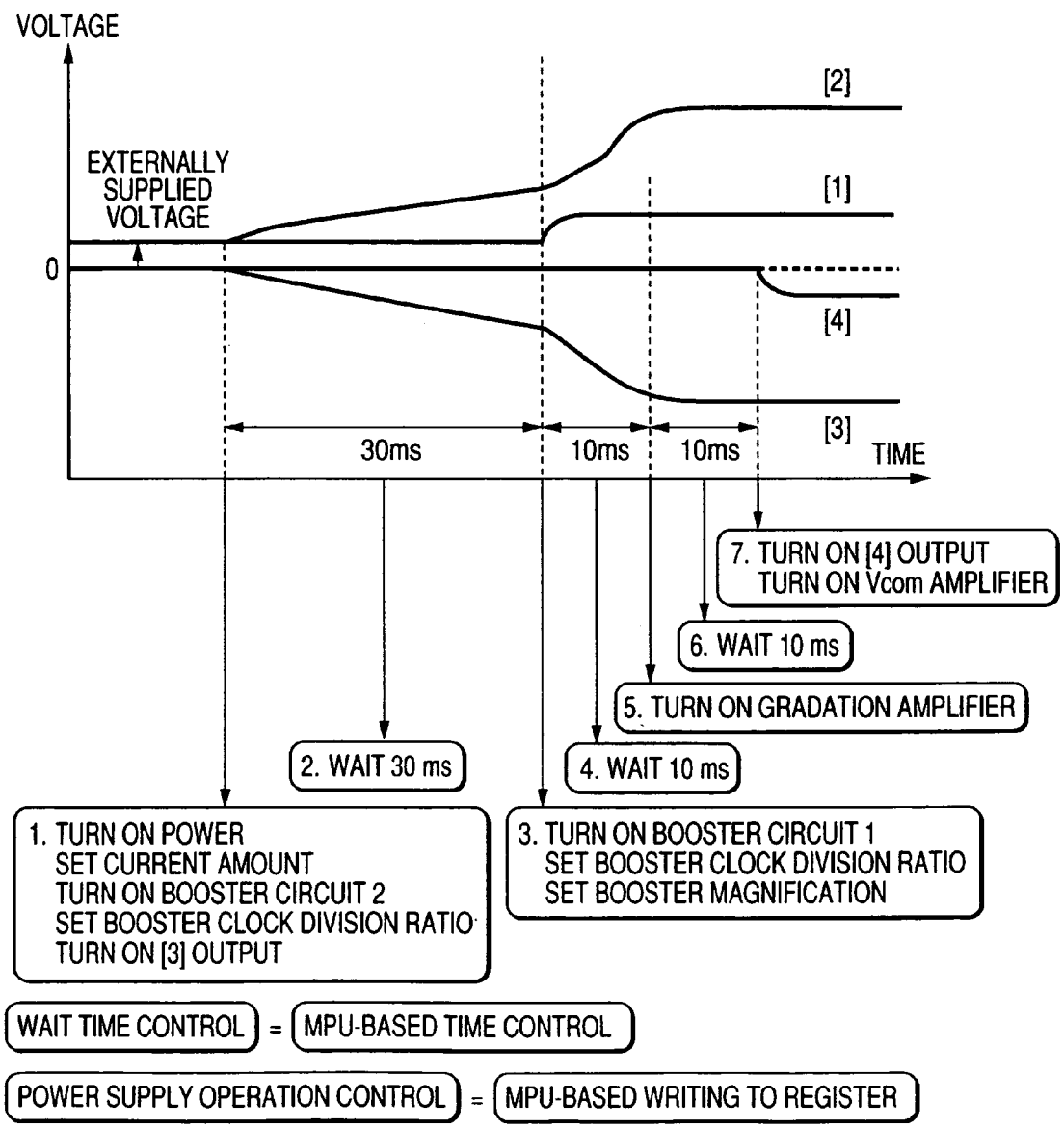
FIG. 15 is an explanatory diagram exemplifying a setup flow and changes in booster circuits for power-on state in FIG. 14 according to the art having no power supply sequencer, in which the art was previously examined by the inventors in order to explain the embodiment of the present invention in comparison with the prior art previously examined by the inventors.

FIG. 15 is an explanatory diagram exemplifying a setup flow and changes in the booster circuits for power-on state in FIG. 14 according to the art having no power supply sequencer. In this case, the art was previously examined by the inventors in order to explain the embodiment of the present invention in comparison with the prior art previously examined by the inventors. The flow in FIG. 15 comprises a sequence of the following steps. At step 1, the power supply turns on. The booster circuit 2 turns on. The booster clock division ratio is set. The voltage output [3] turns on. At step 2, the wait state lasts for 30 ns. At step 3, the booster circuit 1 turns on. The booster clock division ratio is set. The booster magnification is set. At step 4, the wait state lasts for 10 ns. At step 5, the gradation amplifier turns on. At step 6, the wait state lasts for 10 ns. At step 7, the voltage output [4] turns on. The Vcom amplifier turns on. The voltage outputs [1] through [4] generate waveforms as shown in FIG. 15. As mentioned above, the microprocessor unit provides the wait time control. The microprocessor unit controls power supply operations by writing to the instruction register.

Figure 16:
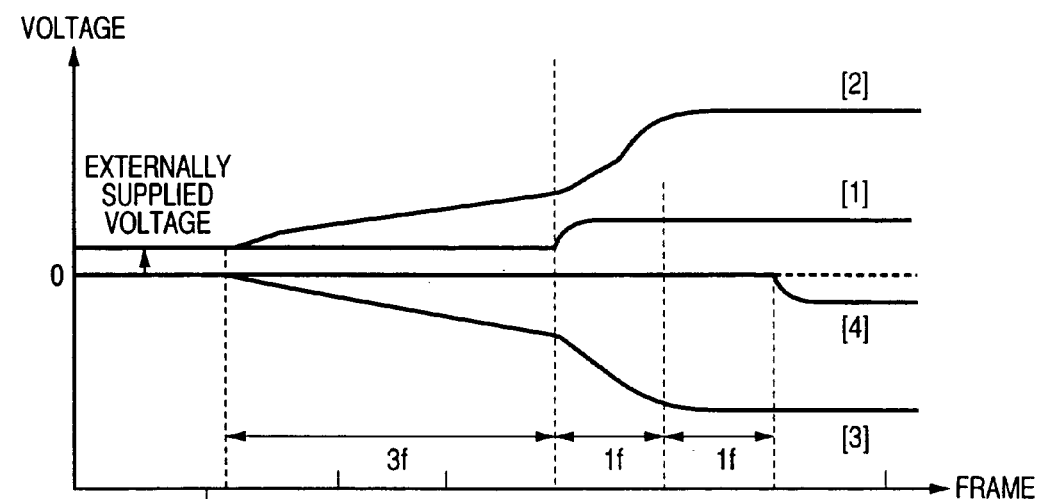
FIG. 16 is an explanatory diagram exemplifying a setup flow and changes in booster circuits for power-on state in FIG. 14 which explains the embodiment of the present invention having the power supply sequencer.

FIG. 16 is an explanatory diagram exemplifying a setup flow and changes in the booster circuits for power-on state in FIG. 14 which explains the embodiment of the present invention having the power supply sequencer. The control flow in FIG. 16 comprises the following steps. First, step 1 is performed at a time. Then, only step 2 follows. At step 1, control is given to use the sequencer, set the power supply startup, set the current amount, set the booster circuit 1 operation, set the booster circuit 2 operation, set the booster clock division ratio, set the booster magnification, set the gradation amplifier operation, set the [3] output operation, set the [4] output operation, set the Vcom amplifier operation, set the wait time, and start the power supply sequencer. At step 2, the power supply sequence terminates to wait until the power supply starts.

This embodiment sets operations of the power supply sequencer and accordingly increases setup items for it. As shown in FIG. 16, the voltage outputs [1] through [4] change in the same manner as shown in FIG. 15 except that the time axis is represented in units of frames (f), i.e., the display time per screen as the minimum unit. The wait time control according to the embodiment is performed inside the power supply sequencer. The power supply sequencer controls power supply operations by validating setting values in the driver LSI. The following describes the power supply control system.

Figure 17:
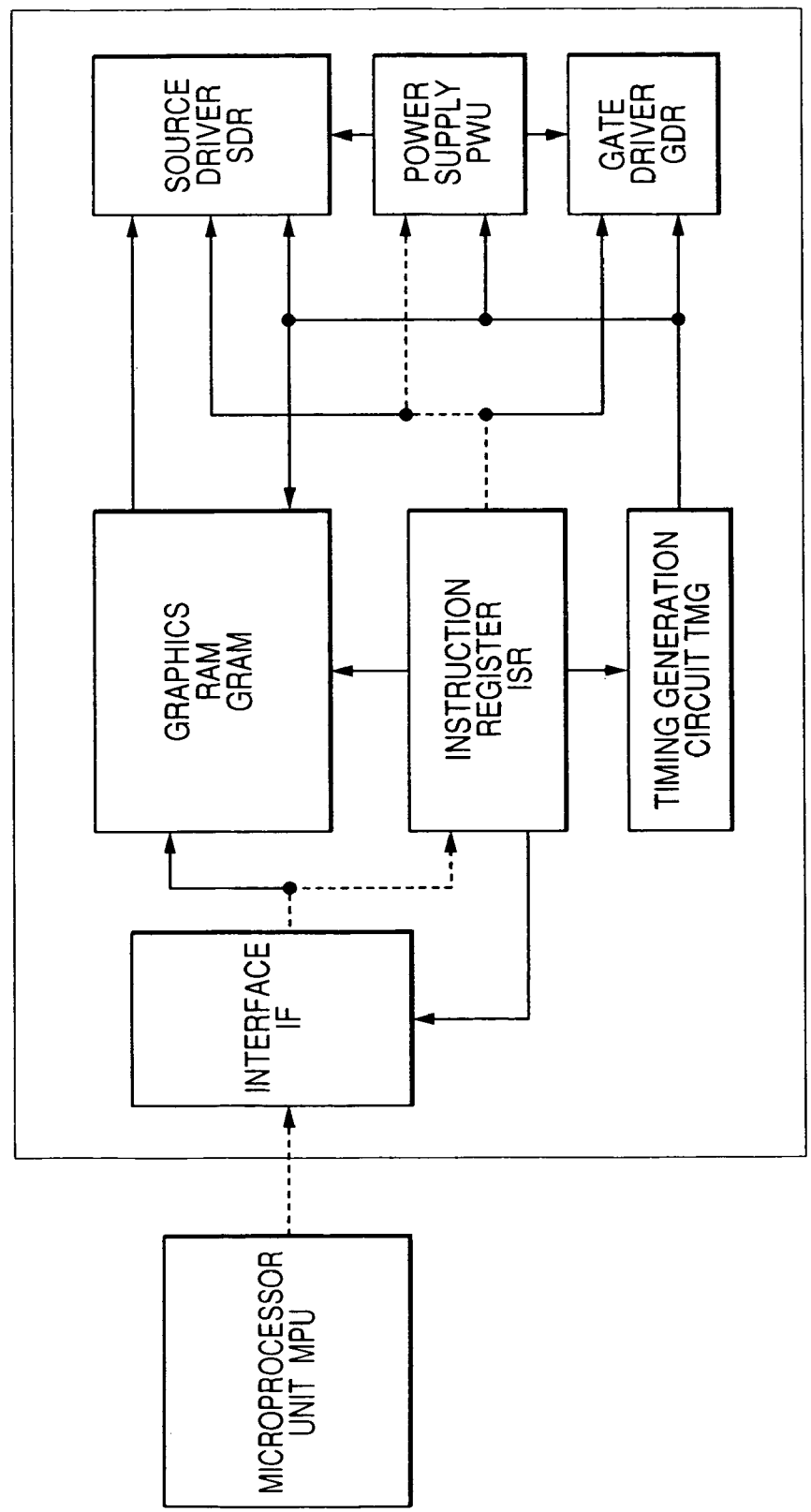
FIG. 17 is a block diagram showing a circuit configuration of a liquid crystal driver having no power supply sequencer previously examined by the inventors in order to describe the embodiment of the present invention in comparison with the prior art.

FIG. 17 is a block diagram showing a circuit configuration of a conventional liquid crystal driver having no power supply sequencer previously examined by the inventors in order to describe the embodiment of the present invention in comparison with the prior art. In FIG. 17, the broken line indicates a flow of control from the microprocessor unit MPU to the power supply PWU. The liquid crystal driver CRL has the instruction register ISR that stores setting values for determining operations of the driver itself. The liquid crystal driver CRL operates in accordance with setting values written to the instruction register ISR. The microprocessor unit MPU writes setting values to the instruction register ISR for determining operations of the power supply unit PWU. The setting values written to the instruction register ISR are designed to determine operations of the power supply unit PWU.

According to the circuit configuration in FIG. 17 of the art previously examined by the inventors, the setting values in the instruction register ISR directly control operations of the blocks in the power supply unit PWU. Accordingly, the instant that the microprocessor unit MPU writes a setting value to the instruction register ISR, the power supply unit PWU starts or stops. Therefore, in order to execute the power supply setup flow, the microprocessor unit MPU must measure a timing to write setting values to the instruction register ISR. By contrast, the embodiment according to the present invention provides the power supply sequencer to perform the following control.

Figure 18:
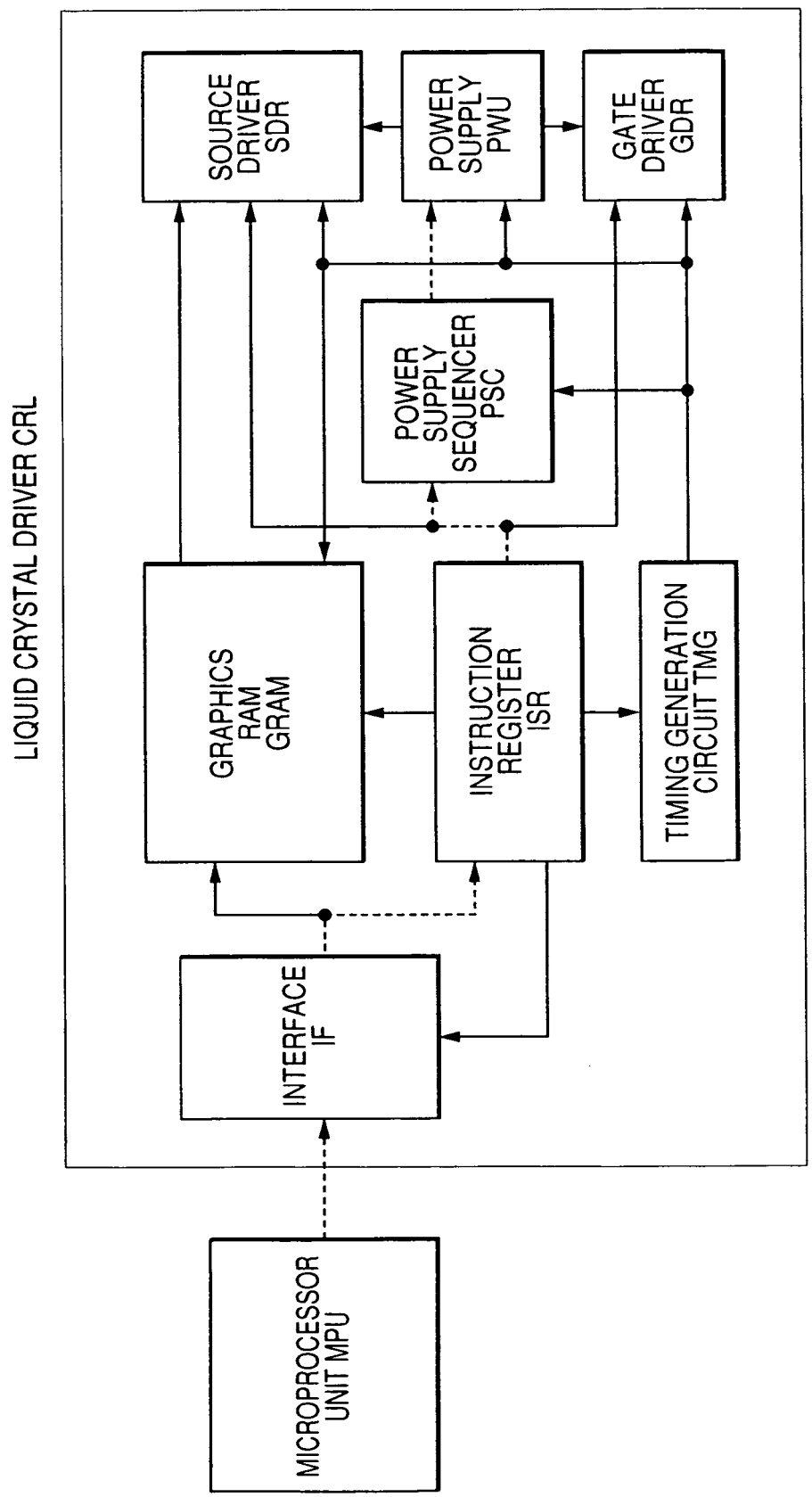
FIG. 18 is a block diagram showing a circuit configuration of a liquid crystal driver having the power supply sequencer according to the embodiment of the present invention.

FIG. 18 is a block diagram showing a circuit configuration of a liquid crystal driver having the power supply sequencer according to the embodiment of the present invention. In FIG. 18, the power supply sequencer PSC is provided between the instruction register ISR and the power supply unit PWU. This configuration does not directly supply control signals from the instruction register ISR to the power supply unit PWU. The microprocessor unit MPU can write setting values in batch to the instruction register ISR without performing the time control.

The power supply sequencer PSC counts the time in its inside and sequentially supplies the power supply unit PWU with the setting values written to the instruction register ISR. The instruction register ISR is capable of setting times and orders for inputting the setting values to the instruction register ISR itself. A signal used for display operations is also used for the time measurement in the power supply sequencer PSC. According to the embodiment, this signal corresponds to the first frame signal.

This configuration eliminates the need for special time control for the power supply setup from the microprocessor unit MPU. The microprocessor unit MPU can write register setting values for power supply startup by ignoring the wait time. Consequently, only changing the instruction register setting can change the power supply setup flow in the control program of the microprocessor unit MPU.

Figure 19:
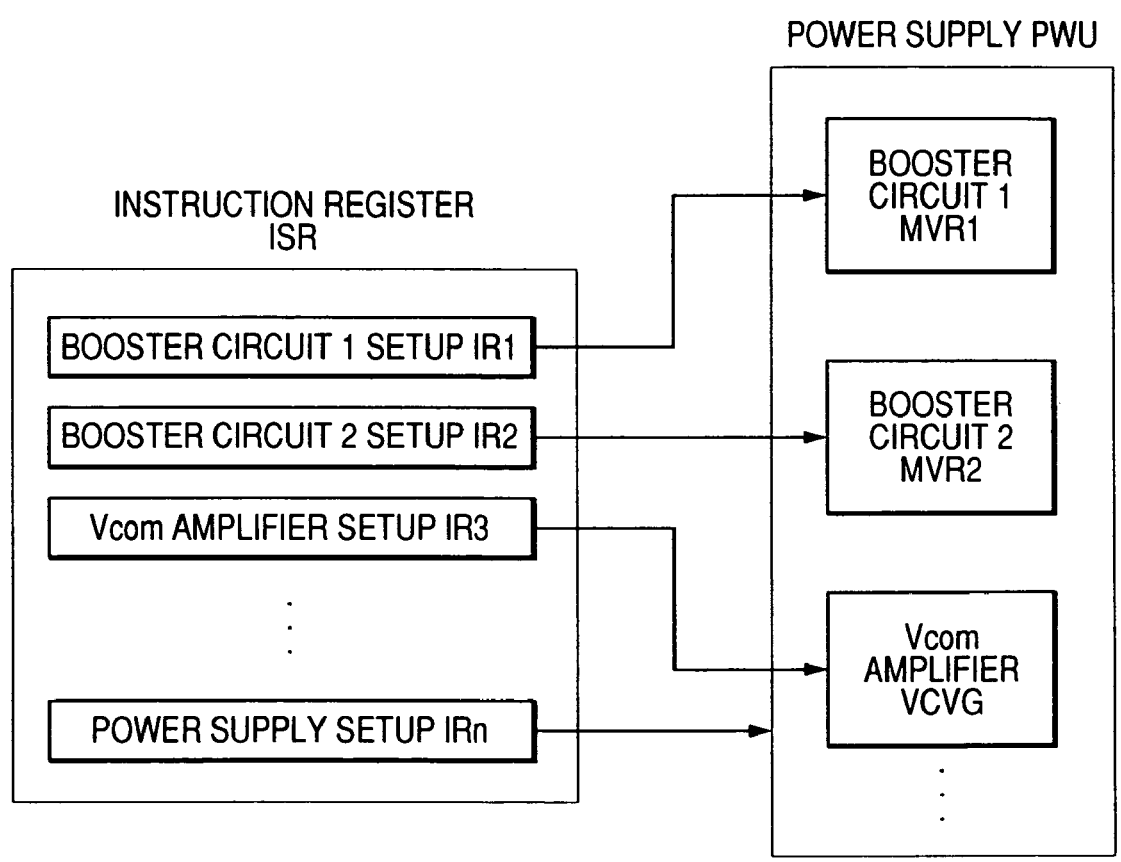
FIG. 19 is a pattern diagram showing a configuration of a power supply and an instruction register in the liquid crystal driver previously examined by the inventors in order to describe the embodiment of the present invention in comparison with the prior art.

FIG. 19 is a pattern diagram showing a configuration of a power supply and an instruction register in the liquid crystal driver previously examined by the inventors in order to describe the embodiment of the present invention in comparison with the prior art previously examined by the inventors. The instruction register IS R comprises registers IR1, IR2, IR3, . . . , and IRn. These registers are used to set operations of power supply parts such as the booster circuits 1 and 2, the Vcom amplifier, and the like. For example, the register IR1 sets operations of the booster circuit 1. The register IR2 sets operations of the booster circuit 2. The register IR3 sets operations of the Vcom amplifier. The register IRn sets overall power supply operations and the current amount. According to the prior art, outputs from the registers are directly input. That is to say, output from the register IR1 is supplied to the booster circuit 1 (MVR1) of the power supply unit PWU. Output from the register IR2 is supplied to the booster circuit 2 (MVR2) of the power supply unit PWU. Output from the register IR3 is supplied to the Vcom amplifier (VCVG) of the power supply unit PWU. Likewise, output from the register IRn is directly supplied to the power supply. By contrast, the embodiment of the present invention is configured as follows.

Figure 20:
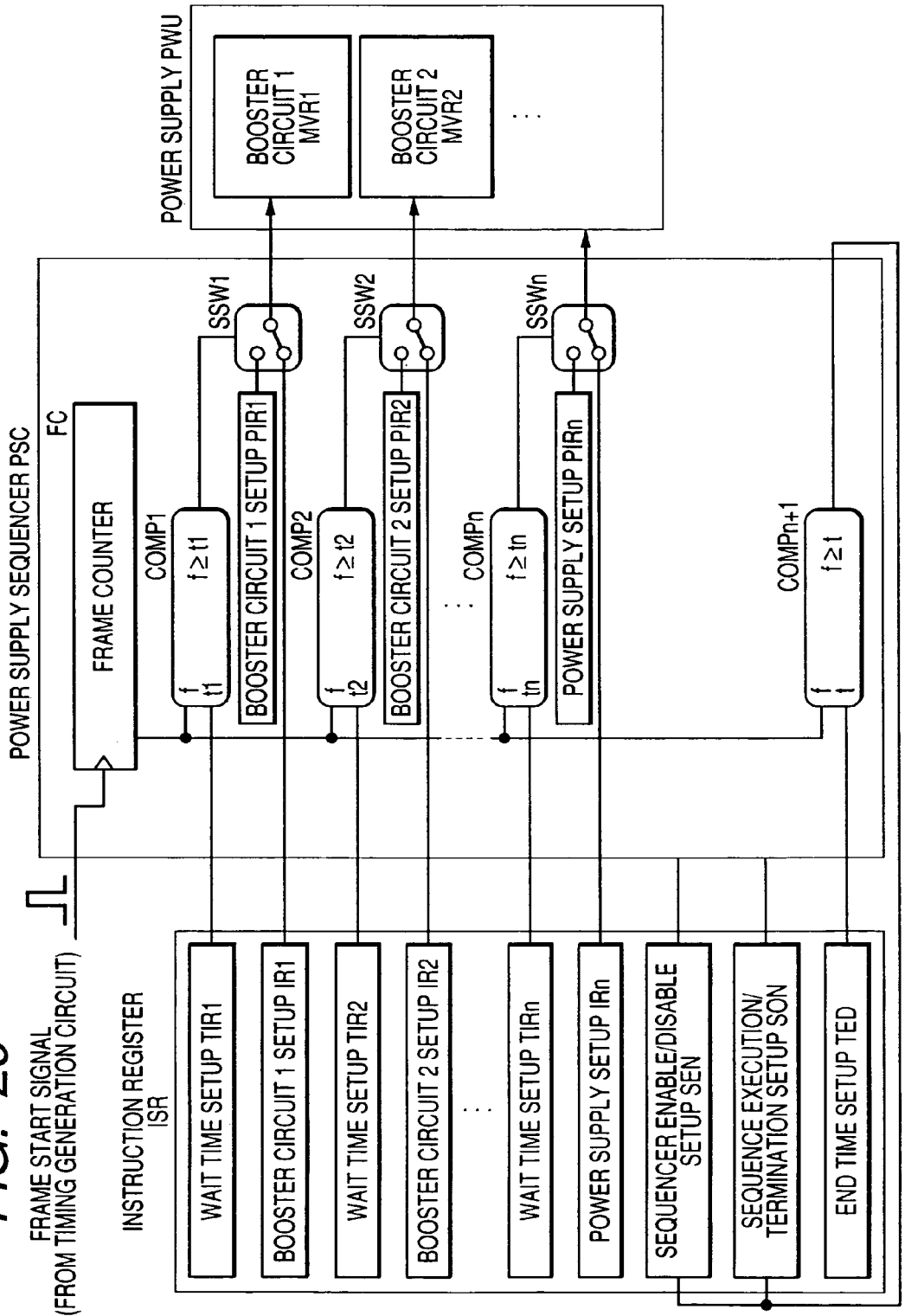
FIG. 20 is a pattern diagram showing a configuration of a power supply and an instruction register in the liquid crystal driver having the power supply sequencer according to the embodiment of the present invention.

FIG. 20 is a pattern diagram showing a configuration of the power supply and the instruction register in the liquid crystal driver having the power supply sequencer according to the embodiment of the present invention. In addition to the registers in FIG. 19, the instruction register ISR comprises wait time setup registers TIR1, TIR2, . . . , and TIRn, a sequencer enable/disable setup register SEN, a sequence start/stop setup register SON, and a sequence termination time setup register TED. The wait time setup registers TIR1 through TIRn are provided for the power supply control registers IR1 through IRn, respectively. The wait time setup registers TIR1 through TIRn are assigned wait times until the power supply is provided with outputs from the power supply control registers IR1 through IRn, respectively.

The sequence termination time setup register TED specifies the time to terminate a sequence of the power supply sequencer. The sequencer enable/disable setup register SEN specifies the state to use the power supply sequencer or the state not to use it (stop state). Writing a setting value to this sequencer enable/disable setup register SEN determines whether or not to use the power supply sequencer in the power-on sequence. When the sequence terminates, a setting value for the unused state is automatically written. The sequence start/stop setup register SON contains two values to specify whether or not the power supply sequencer makes a sequence executable. When a setting value for the sequence execution state is written to the sequence start/stop setup register SON, the power supply sequencer actually starts executing the sequence. When the sequence terminates, a setting value for the termination state is written automatically.

The power supply sequencer PSC is provided with a frame counter FC, comparators COMP1, COMP2, ..., COMPn, and COMPn+1, and selection switches SSW1, SSW2, ..., and SSWn. The power supply sequencer PSC also contains registers PIR1, PIR2, ..., and PIRn to control operations of the power supply parts. These registers PIR1 through PIRn previously contain setting values that turn off the power. The frame counter FC counts a pulse (first frame signal) that is generated once for each frame from the timing generation circuit TMG (see FIG. 18). The comparators COMP1 through COMPn each compare a value measured in the frame counter FC with setting values for the wait time setup registers TIR1 through TIRn in the instruction register ISR. When the frame counter FC indicates the measured value smaller than a value assigned to the ith wait time setup register TIRi (i is any integer ranging from 1 to n), the power supply sequencer PSC supplies the power supply unit PWU with a value (a signal to stop the power supply) assigned to register PIRi in the power supply sequencer PSC. When the measured value reaches the setting value or higher, the power supply sequencer PSC selects the corresponding signal selection switch SSWi to supply the power supply unit PWU with a value (a signal to operate the power supply) assigned to register IRi in the instruction register ISR. Therefore, the use of the wait time setup registers TIR1, TIR2, ..., TIRn enables a setting value to be variably assigned to the power supply unit PWU on a time basis. The sequencer enable/disable setup register SEN makes it possible to select whether to use the power supply sequencer PSC or to allow the microprocessor unit MPU to set the power supply unit PWU including the time control.

Figure 21A:
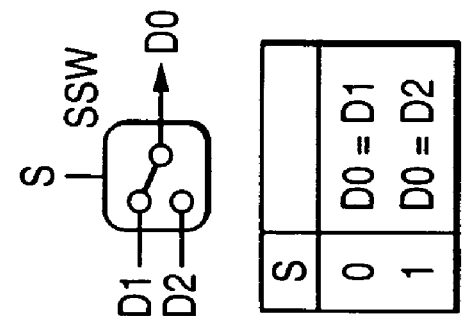
FIG. 21 is an explanatory diagram showing operations of a frame counter, a comparator, and a selection switch in FIG. 20.
Figure 21B:
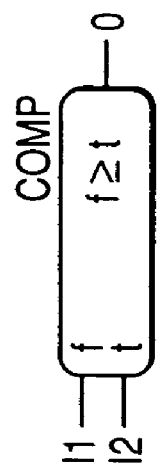
Figure 21C:
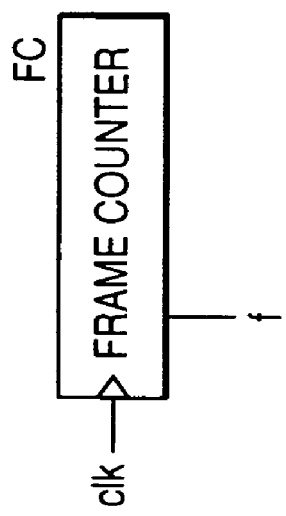

FIG. 21 is an explanatory diagram showing operations of the frame counter, the comparator, and the selection switch in FIG. 20. The frame counter FC measures a frame pulse f based on a clock clk. The clock clk set to 1 increments the frame pulse f by 1. The clock clk reset to 0 holds this state. A first input I1 is supplied with a measured value for the frame pulse f. A second input I2 is supplied with a value assigned to the wait time setup register. The comparator COMP compares the value for the first input I1 with the value for the second input I2. The comparator COMP sets output O to 1 when $I1 \geq I2$; otherwise to 0. The selection switch SSW is supplied with outputs D1 and D2. The output D1 is generated from the registers PIR1 through PIRn in the power supply sequencer PSC. The output D2 is generated from the setup registers IP1 through IPn in the instruction register ISR. The selection switch SSW selects the output D1 or D2 based on comparison output S from the corresponding comparison circuits COMP1 through COMPn to output DO. The output DO equals D1 when the comparison circuit COMP generates comparison output S reset to 0. The output DO equals D2 when the comparison circuit COMP generates comparison output S set to 1.

When counting termination time TED of the specified power supply sequence, the comparator COMPn+1 outputs a disable signal to the sequencer enable/disable setup register SEN and a stop signal to the sequence start/stop setup register SON in the instruction register ISR. The power supply sequencer PSC receives this signal to terminate its operation. After the power supply sequencer PSC terminates, the parts of the power supply unit PWU are ready to be directly supplied with outputs from the power supply control register IR1 through IRn.

Figure 22:
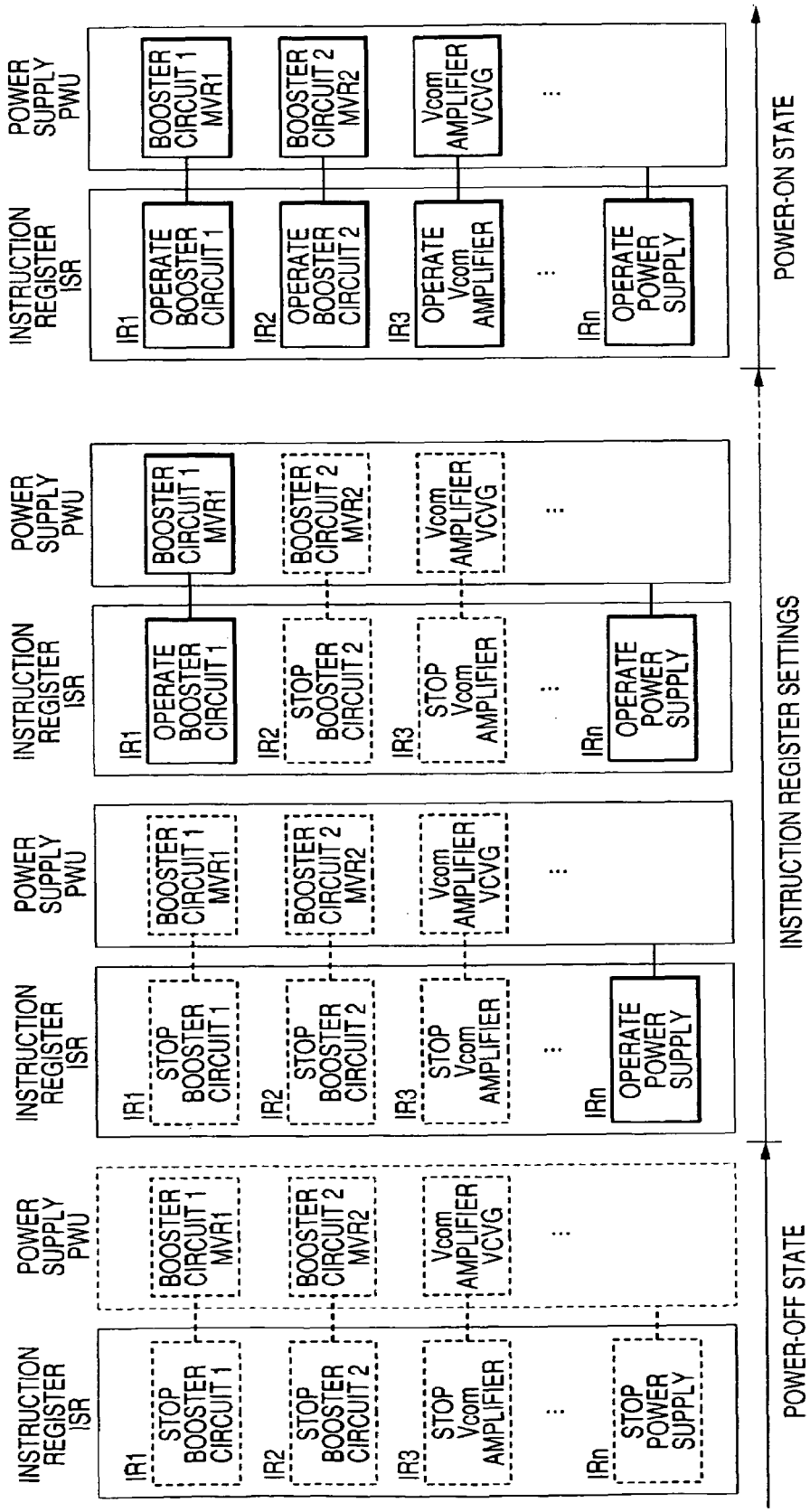
FIG. 22 is an explanatory diagram showing a power supply startup flow under microprocessor unit control in the liquid crystal driver previously examined by the inventors in order to describe the embodiment of the present invention in comparison with the prior art.

FIG. 22 is an explanatory diagram showing a power supply startup flow under microprocessor unit control in the liquid crystal driver previously examined by the inventors in order to describe the embodiment of the present invention in comparison with the prior art previously examined by the inventors. In FIG. 22, a dotted line indicates the power supply nonoperating state and its setup content. A solid line indicates the power supply operating state and its setup content. In the power supply nonoperating state (represented as power-off state in FIG. 22), values that turn off the power supply are assigned to the registers IR1 through IRn in the instruction register ISR. When the instruction register ISR is set, power supply setup register IRn in the instruction register ISR is first assigned the setting value for the operating state to enable the overall power supply operation. Then, the booster circuit 1 setup register IR1 is assigned the setting value for the operating state to start the booster circuit 1 (MVR1). The operating state is subsequently set to the setup registers IR2, IR3, and so on at proper times to start the parts of the power supply.

In the power supply operating state (represented as power-on state in FIG. 22), all registers in the instruction register ISR are set. The booster circuit 1 (MVR1), the booster circuit 2 (MVR2), ..., and the Vcom amplifier VCVG become active. By contrast, the embodiment of the present invention uses the power supply sequencer to provide the following control flow.

Figure 23:
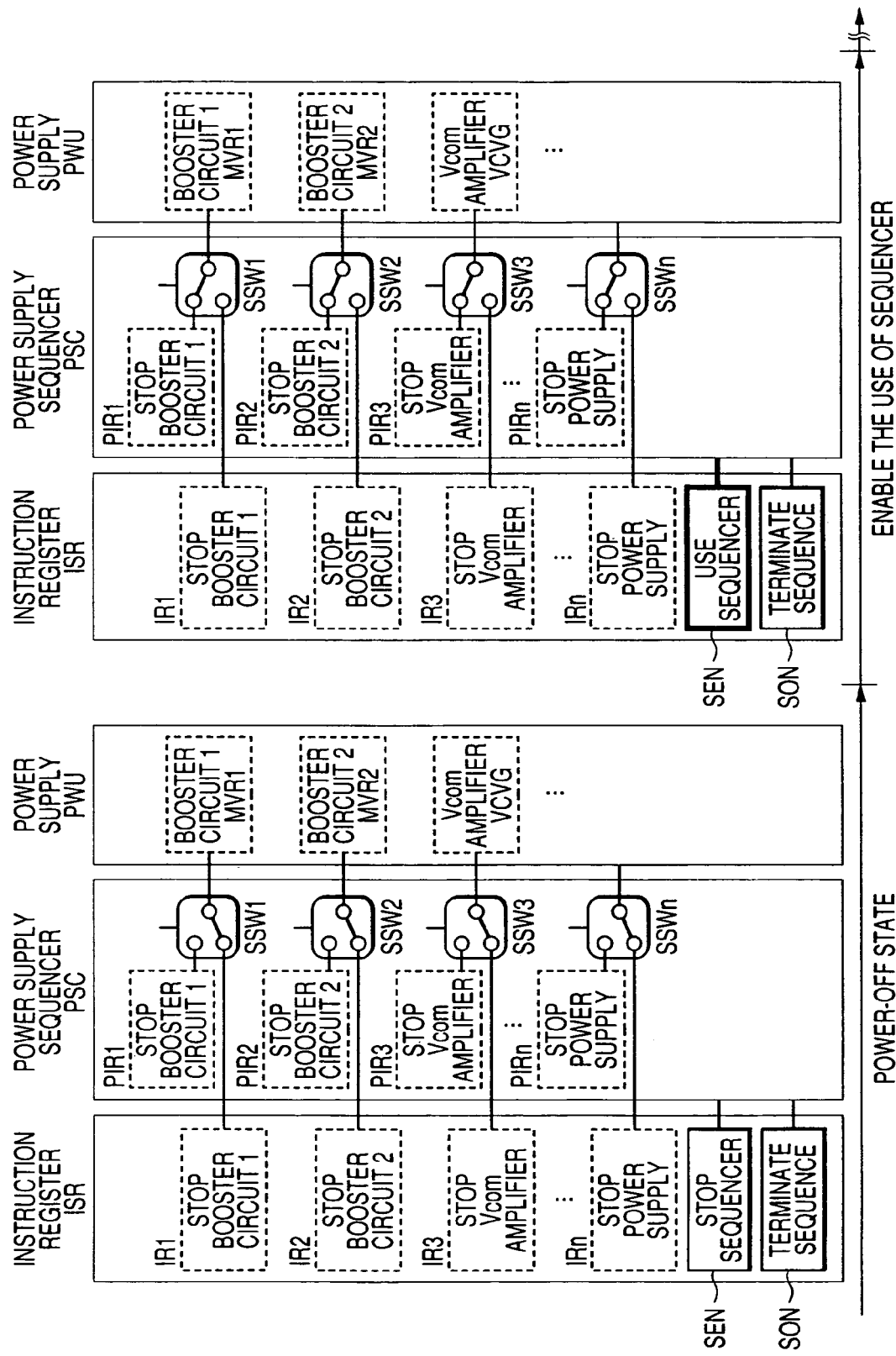
FIG. 23 is an explanatory diagram showing a power supply startup flow in order to describe the embodiment of the present invention having the power supply sequencer.
Figure 24:
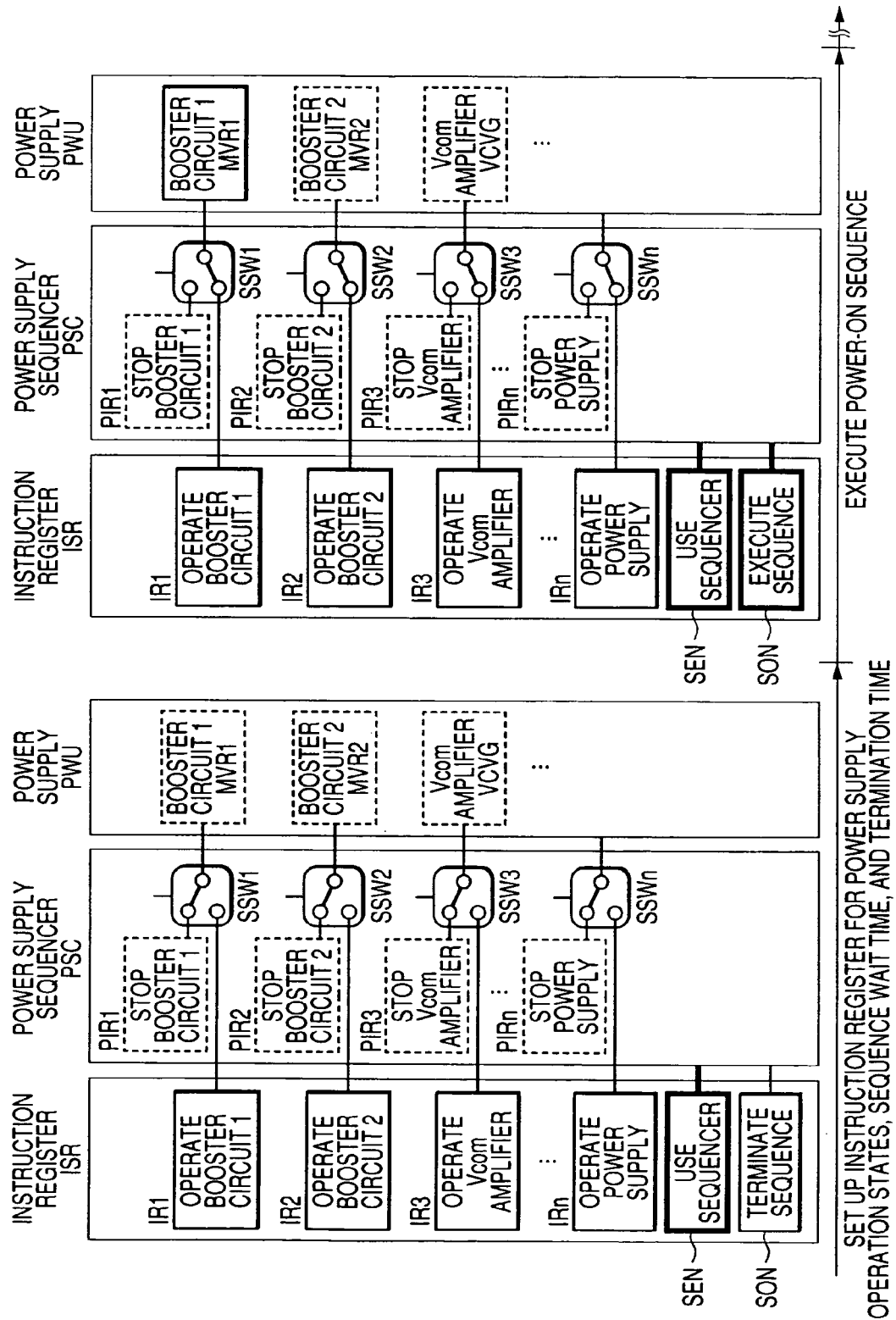
FIG. 24 is an explanatory diagram continued from FIG. 23, i.e., the power supply startup flow in order to describe the embodiment of the present invention having the power supply sequencer.
Figure 25:
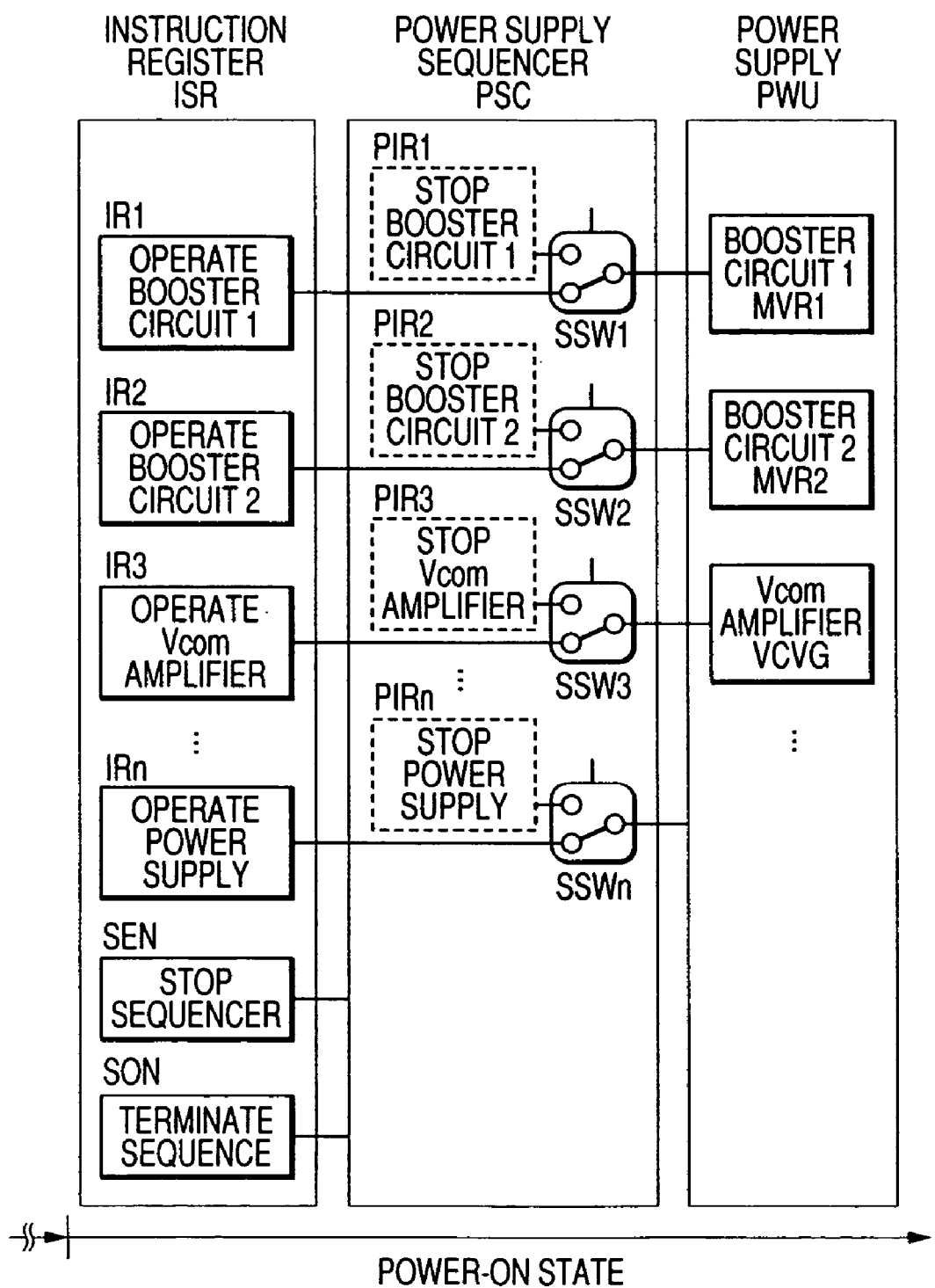
FIG. 25 is an explanatory diagram continued from FIG. 24, i.e., the power supply startup flow in order to describe the embodiment of the present invention having the power supply sequencer.

FIGS. 23, 24, and 25 are explanatory diagrams showing a power supply startup flow in order to describe the embodiment of the present invention having the power supply sequencer. The flow in FIG. 24 continues from FIG. 23. The flow in FIG. 25 continues from FIG. 24. In FIGS. 23 through 25, the reference symbols SSW1 through SSWn denote selection switches. The same reference symbols as in FIG. 22 correspond to the same functional parts. Like in FIG. 22, a dotted line indicates the power supply nonoperating state and its setup content. A solid line indicates the power supply operating state and its setup content. In the power supply nonoperating state (power-off state) in FIG. 23, values that turn off the power supply are assigned to the registers IR1 through IRn in the instruction register ISR and the registers PIR1 through PIRn in the power supply sequencer PSC. To start the power supply from the power supply nonoperating state, a setting value to enable the power supply sequencer needs to be set to the sequencer enable/disable setup register SEN in the instruction register ISR.

1. The instruction register IS R supplies the power supply sequencer PSC with a control signal to enable the power supply sequencer (FIG. 23). Signals to control the parts of the power supply unit PWU change from those output from the instruction register ISR to those output from the registers in the power supply sequencer PSC. The setting values before and after the change function the same to stop the power supply, having no effects on power supply operations.

2. The setting value for the operating state is written to the power supply control registers IR1 through IRn in the instruction register ISR. At the same time, though not shown in FIGS. 23, 24, and 25, the setting value is also written to the wait time setup register TIR1 through TIRn and the sequence termination time setup register TED in the instruction register ISR as shown in FIG. 20.

3. The sequence execution state is enabled (FIG. 24). After the sequence starts, there may be a match between any of the values assigned to the wait time setup registers TIR1 through TIRn and a measured value in the frame counter FC. At this time, the corresponding selection switch SSW functions to return the control signal to that output from the instruction register ISR. The nonoperating-state signals sequentially change to the operating-state signals.

Finally, the power supply unit PWU is directly supplied with outputs from the power supply control registers IR1 through IRn in the instruction register ISR (power-on state in FIG. 25). The sequence terminates when the measure value in the frame counter FC matches the value assigned to the sequence termination time setup register TED. The power supply sequencer PSC terminates automatically.

Figure 26:
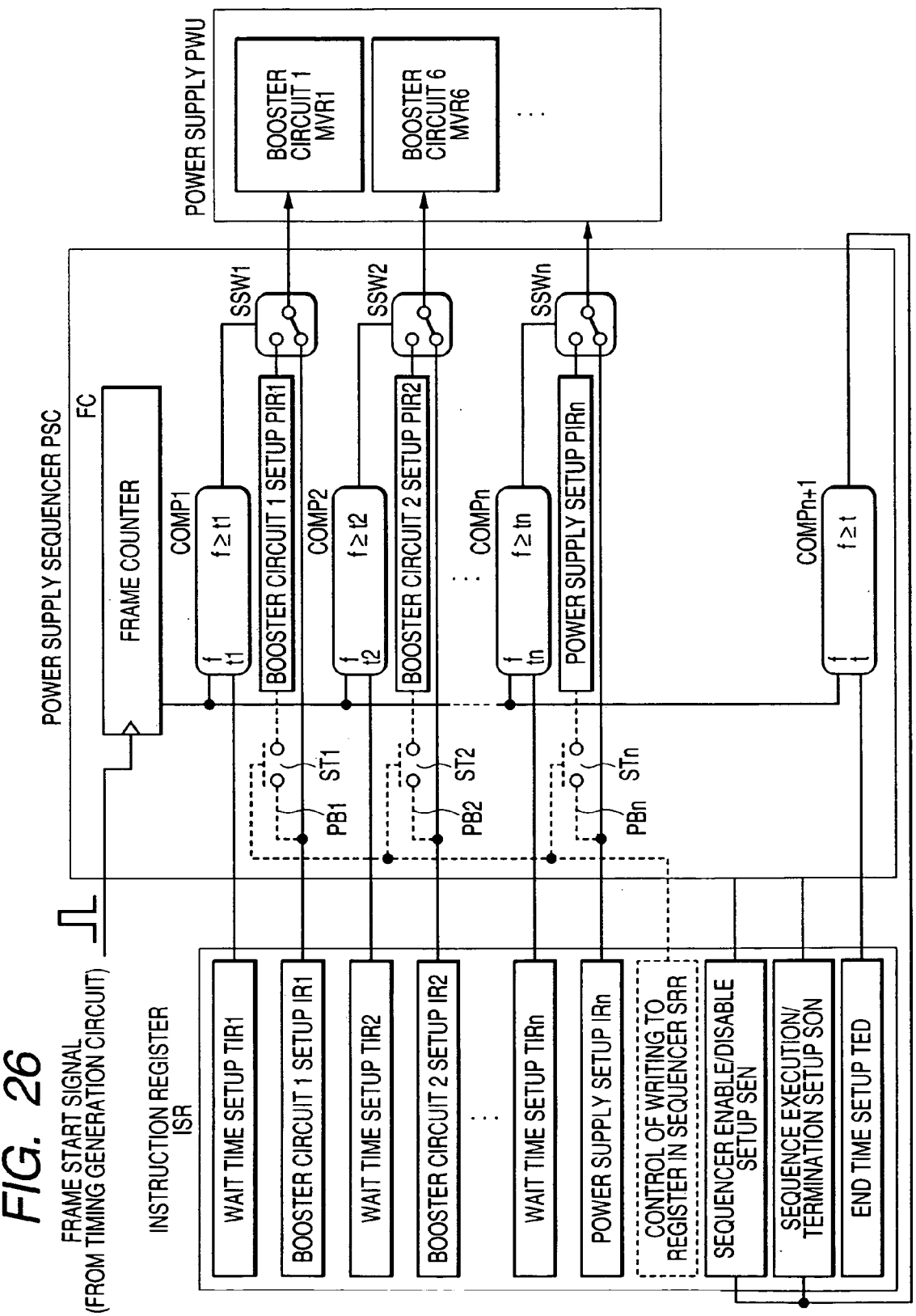
FIG. 26 is a pattern diagram showing a configuration of a power supply and an instruction register in the liquid crystal driver having the power supply sequencer according to another embodiment of the present invention.

FIG. 26 is a pattern diagram showing a configuration of a power supply and an instruction register in the liquid crystal driver having the power supply sequencer according to another embodiment of the present invention. The above-mentioned embodiment is capable of only the setup flow from the nonoperating state to the operating state of the power supply. On the other hand, the present embodiment is also capable of a setup flow for the power supply sequencer PSC from any state to a different state such as a power-off setup flow, for example.

For this purpose, the embodiment adds paths PB1 through PBn from the registers IR1 through IRn for setting power supply operations in the instruction register ISR to the registers PIR1 through n in the power supply sequencer. Further, the embodiment adds a register SRR for write control of the registers in the power supply sequencer. The SRR register is represented as "control of writing to register in sequencer" for the instruction register ISR in FIG. 26. The paths PB1 through PBn from the registers in the instruction register ISR are coupled to the registers PIR1 through PIRn in the sequencer via switches ST1 through STn. The other configurations and operations are the same as those for the above-mentioned embodiment.

When the sequencer register write control register SRR is write-enabled in this configuration, the setting values for the registers PIR1 through PIRn in the power supply sequencer PSC become equal to the values assigned to the registers IR1 through IRn in the instruction register ISR. That is to say, turning on the switches ST1 through STn can copy the setting values written to the power supply control registers IR1 through IRn in the instruction register ISR to the registers PIR1 through PIRn in the power supply sequencer. When the sequencer register write control register SRR is write-disabled, the registers PIR1 through PIRn in the power supply sequencer PSC hold their setting values.

Figure 27:
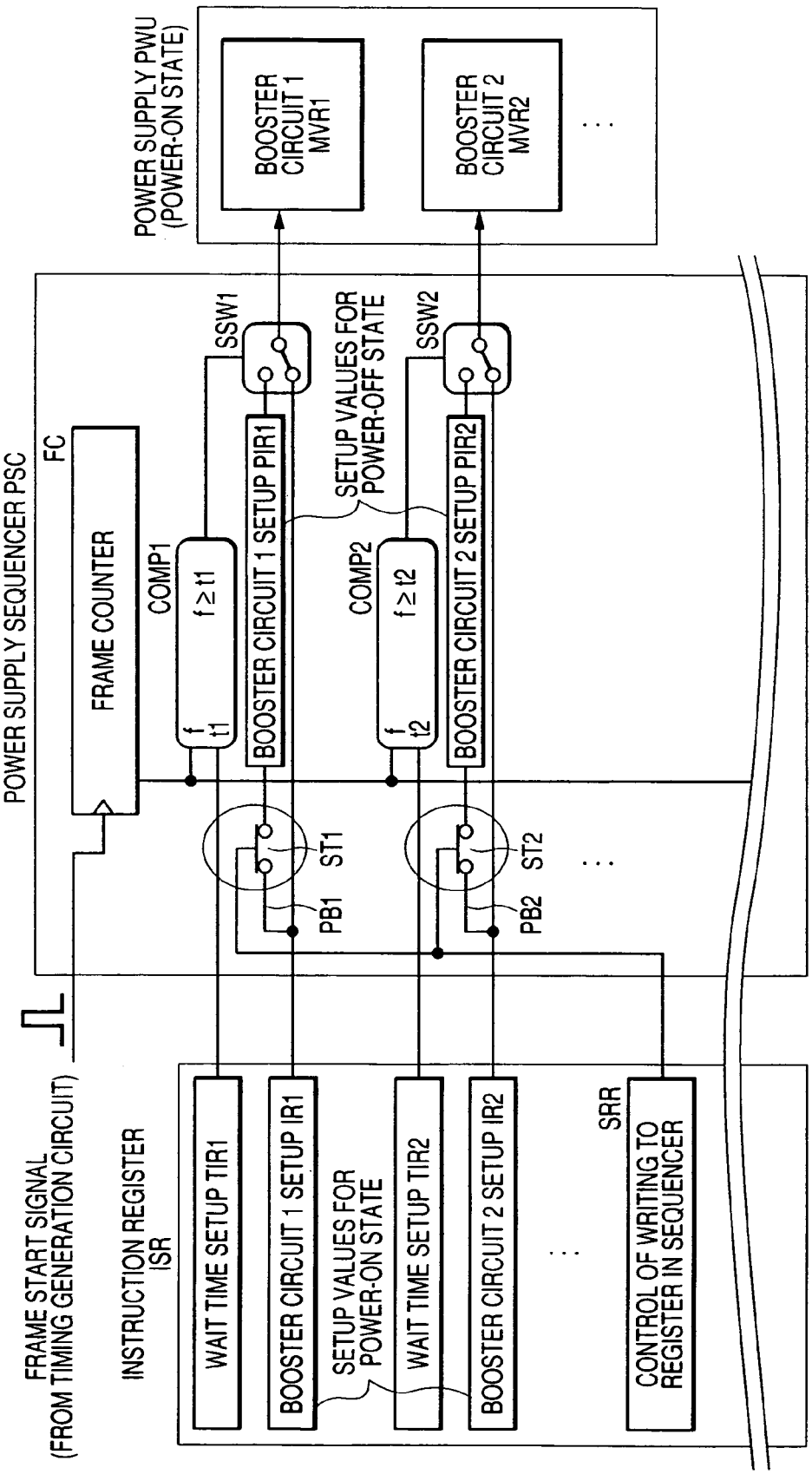
FIG. 27 is an explanatory diagram showing a copy operation to a control register SRR for control of writing to registers in the sequencer described in FIG. 26.
Figure 28:
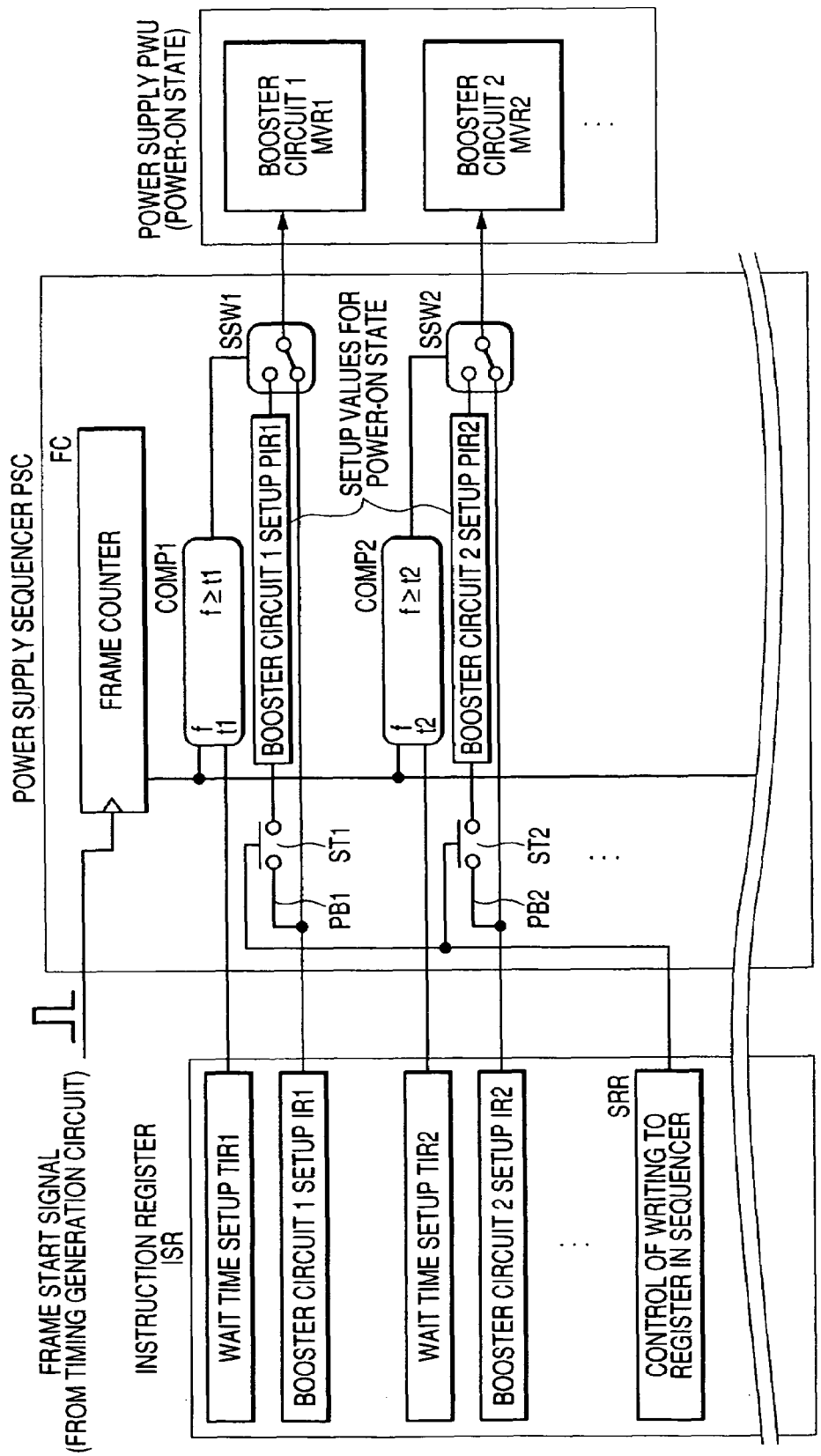
FIG. 28 is an explanatory diagram showing a copy operation to a control register SRR for control of writing to registers in the sequencer described in FIG. 26.

FIGS. 27 and 28 are explanatory diagrams showing the copy operation to the registers PIR1 through PIRn in the power supply sequencer PSC as described in FIG. 26. As shown in FIG. 27, the copy operation rewrites values of the registers in the power supply sequencer PSC when the power supply sequencer terminates and the power supply operates normally. The rewrite operation changes the setting values for the registers PIR1 through PIRn in the power supply sequencer PSC from the power-off state to the power-on state (FIG. 28). The values written to the registers PIR1 through PIRn in the power supply sequencer PSC function as setting values that temporarily control the power supply instead of the power supply control registers IR1 through IRn in the instruction register ISR during the use of the power supply sequencer PSC. The power-off sequence is available if the values for the registers PIR1 through PIRn can be set equally to the setting values for the power supply control registers IR1 through IRn in the instruction register ISR. Therefore, the sequencer register write control register SRR can provide both the power-on sequence and the power-off sequence.

Figure 29:
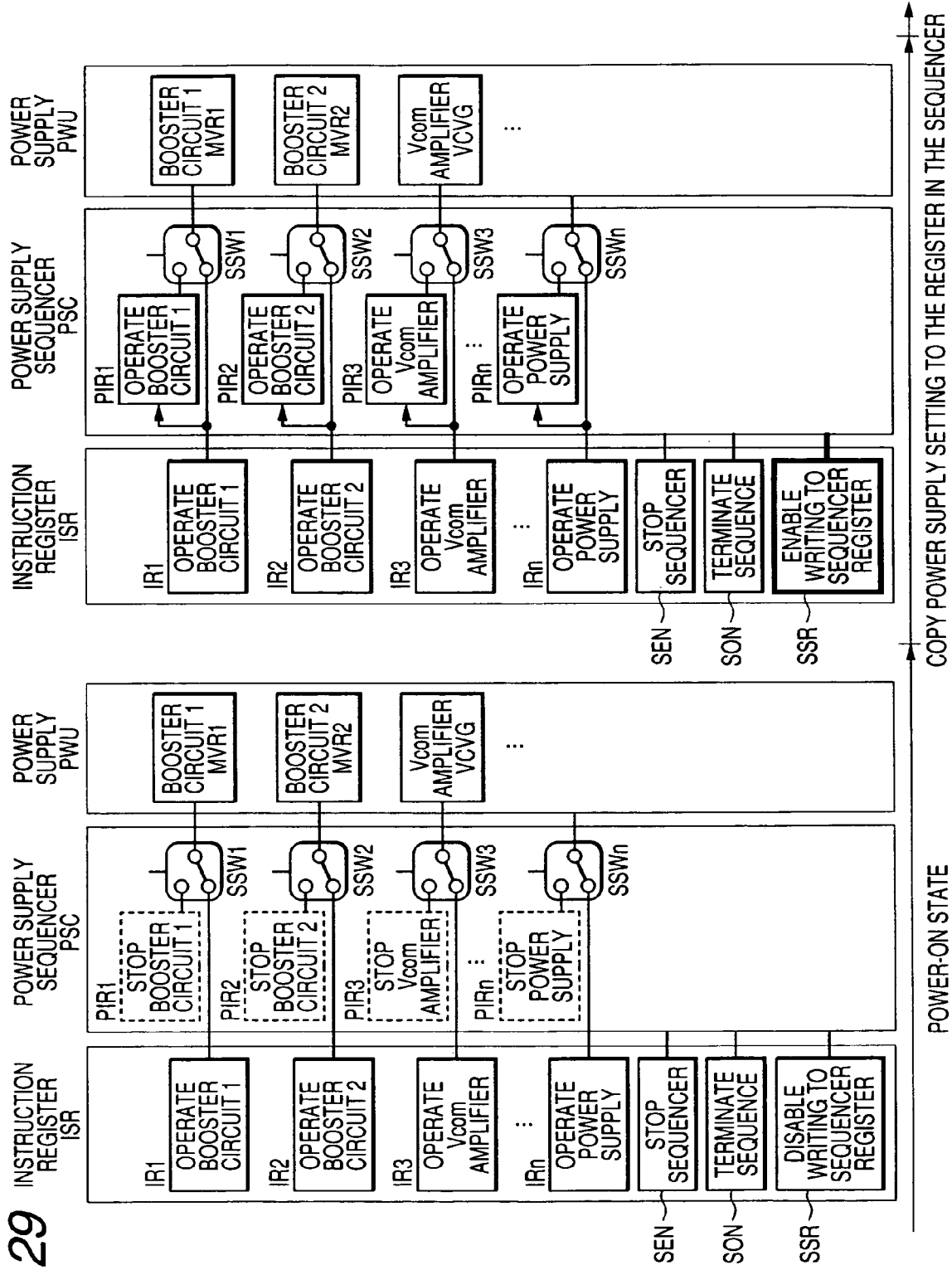
FIG. 29 is an explanatory diagram showing an operation flow of the power supply sequencer in FIG. 26 when it is used to turn the power off.
Figure 30:
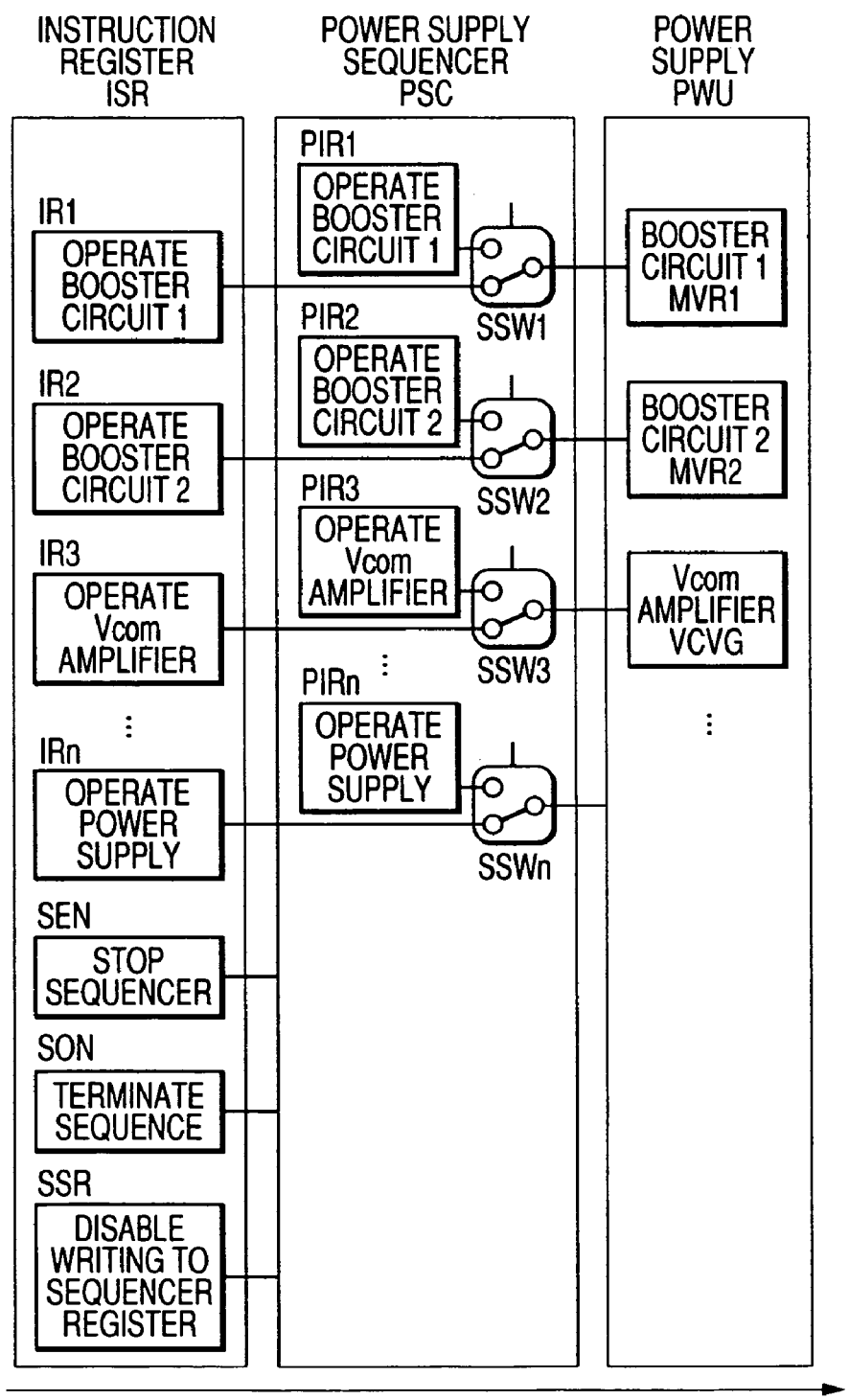
FIG. 30 is an explanatory diagram continued from FIG. 29, i.e., the operation flow of the power supply sequencer in FIG. 26 when it is used to turn the power off.
Figure 31:
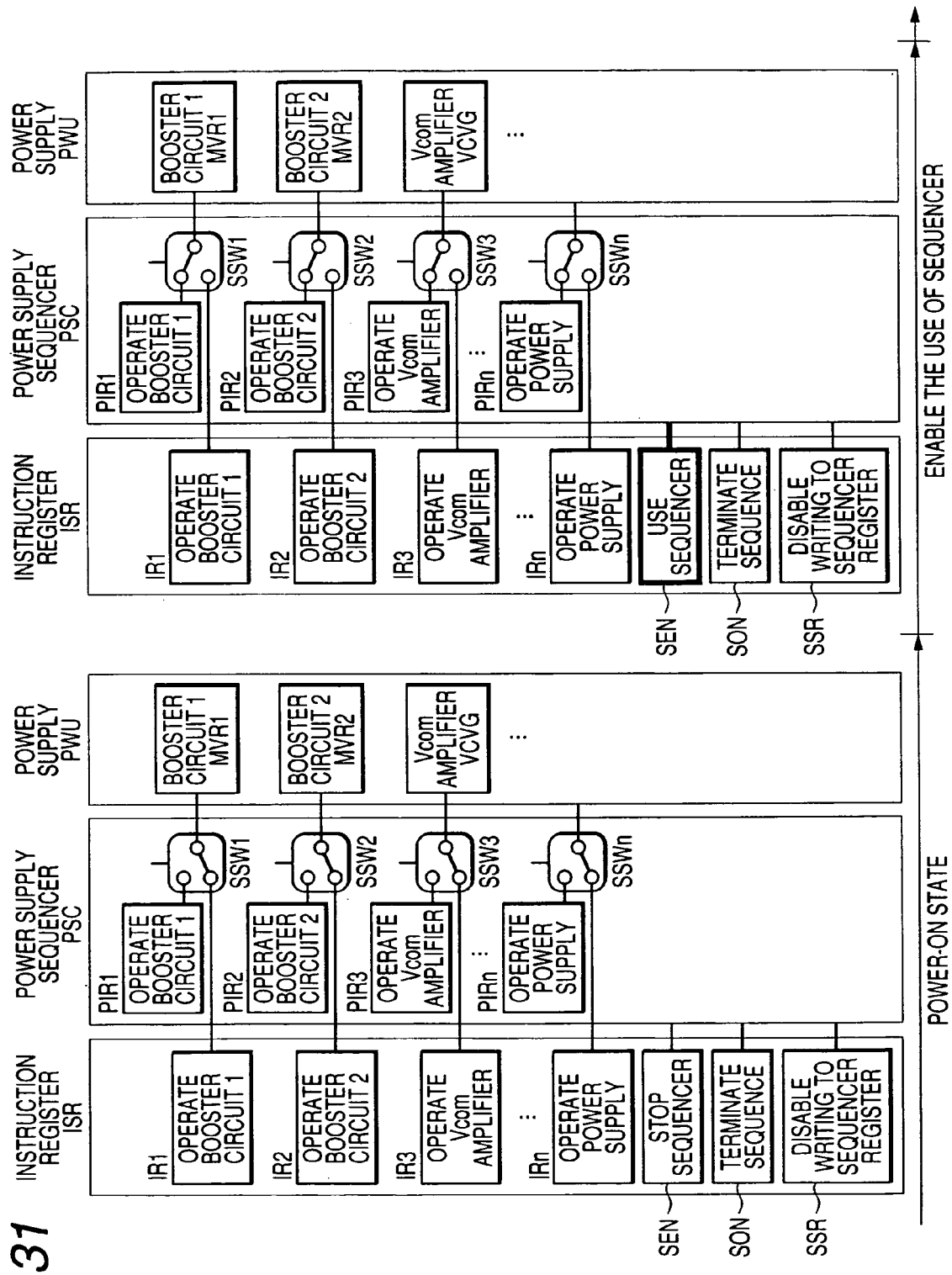
FIG. 31 is an explanatory diagram continued from FIG. 30, i.e., the operation flow of the power supply sequencer in FIG. 26 when it is used to turn the power off.
Figure 32:
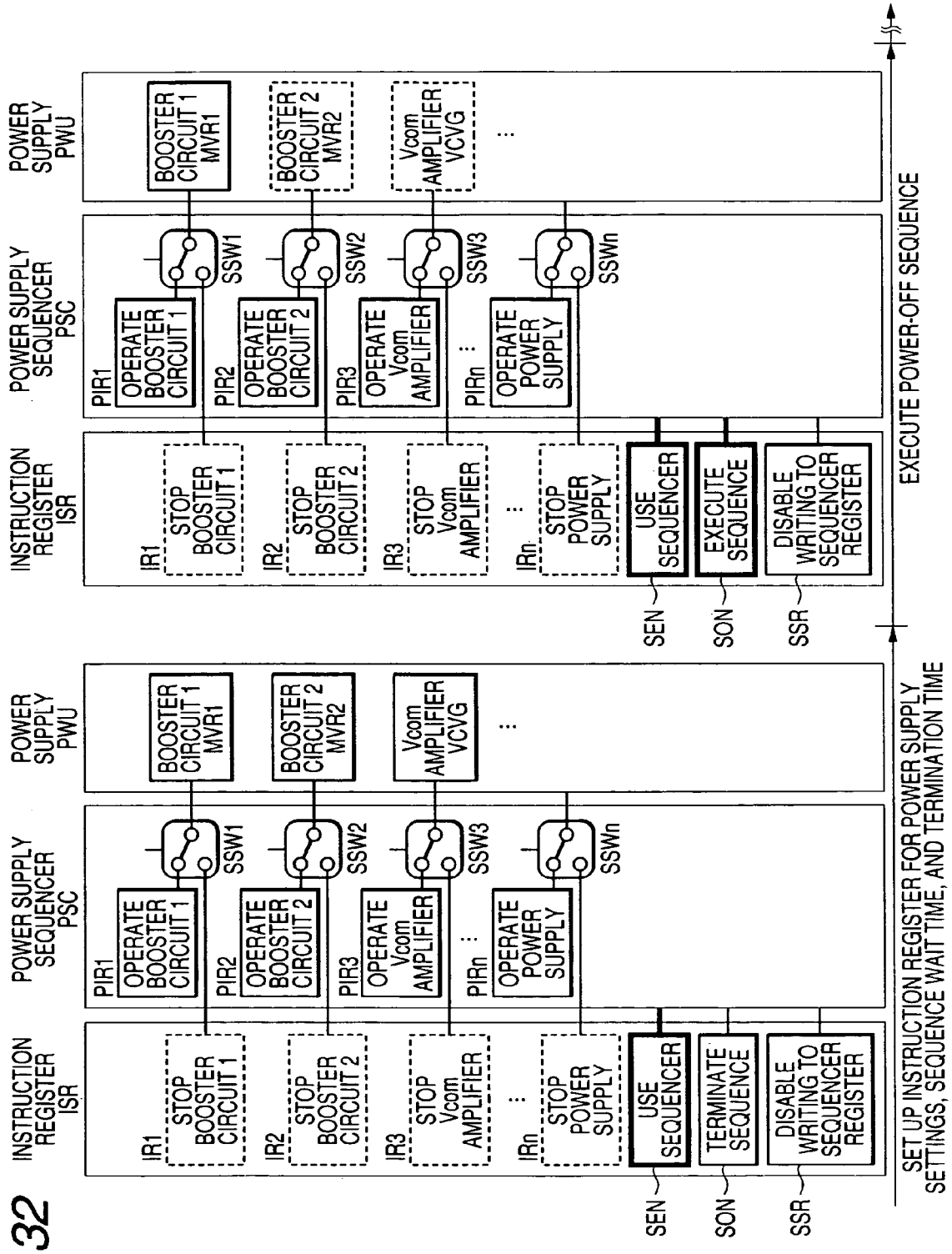
FIG. 32 is an explanatory diagram continued from FIG. 31, i.e., the operation flow of the power supply sequencer in FIG. 26 when it is used to turn the power off.
Figure 33:
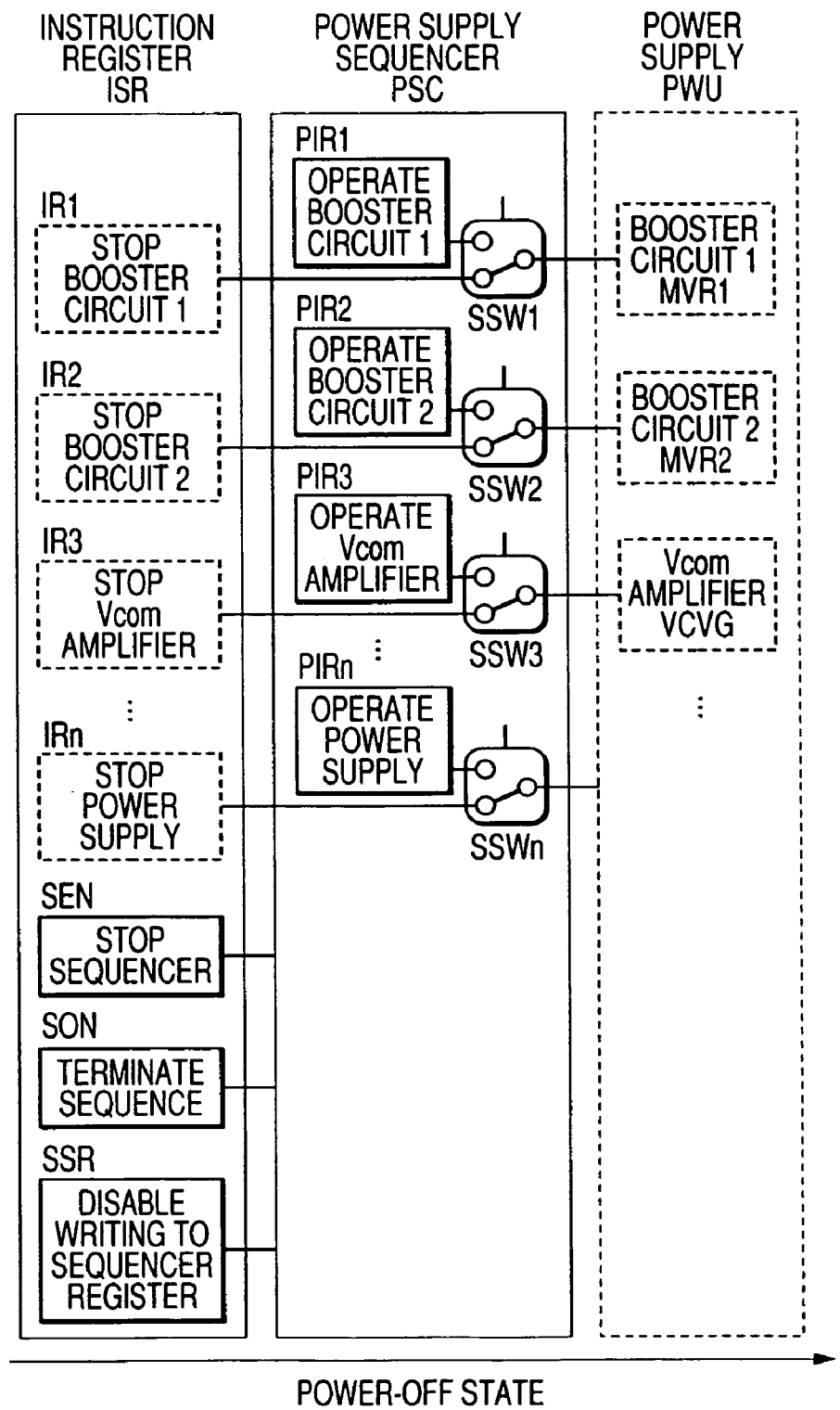
FIG. 33 is an explanatory diagram continued from FIG. 32, i.e., the operation flow of the power supply sequencer in FIG. 26 when it is used to turn the power off.

FIGS. 29, 30, 31, 32, and 33 are explanatory diagrams showing an operation flow of the power supply sequencer in FIG. 26 when it is used to turn the power off. FIG. 30 follows 29. FIG. 31 follows 30. FIG. 32 follows 31. FIG. 33 follows 32. The operation flow will be described with reference to FIGS. 29 through 33. First, in the power supply operating state (without using the power supply sequencer), the operation rewrites the setting values for the registers PIR1 through PIRn in the power supply sequencer PSC to the setting values for the power supply control registers IR1 through IRn in the instruction register ISR (FIG. 29). The subsequent process is almost the same as the power-on sequence (FIG. 30). Then, operations in FIGS. 31 through 33 follow as described below.

In FIGS. 31 through 33:

1. The power supply sequencer PSC is made available (FIG. 31). The operation of the power supply unit PWU is unchanged because it is supplied with the control signal whose setting value remains keeping the operating state of the power supply.

2. Setting values causing the power supply nonoperating state are written to the power supply control registers IR1 through IRn in the instruction register ISR (FIG. 32). At the same time, the sequence termination time and the sequence wait time are set.

3. The sequence starts when the sequence execution state is enabled (at the right of FIG. 32). When there is a match between the measured value in the frame counter FC and the values set to the wait time setup registers TIR1 through TIRn, the control signals are returned to those output from the power supply control registers IR1 through IRn in the instruction register ISR. Here, the operating state changes to the nonoperating state.

4. Step 3 is repeated thereafter. Finally, the power supply is directly supplied with outputs from the power supply control registers IR1 through IRn in the instruction register ISR, and then stops. The sequence terminates when there is a match between the measured value in the frame counter FC and the setting value for the sequence termination time setup register TED. The power supply sequencer terminates automatically.

When the power supply stops, the liquid crystal driver CRL according to the present invention requires the following operations. For example, let us consider that the power supply stops due to exhaustion of the battery as a main power supply of the cellular phone and the like using the liquid crystal driver CRL according to the present invention and that the power is supplied externally afterwards. In such case, the microprocessor unit MPU first issues a power-on reset to various devices under control. The microprocessor unit MPU then writes a setting value for turning off the liquid crystal panel PNL to all the registers in the liquid crystal driver CRL including those in the instruction register ISR and the power supply sequencer PSC. Otherwise, the battery runs down. If the power is supplied externally thereafter, the power supply sequencer PSC contains an unexpected value. Therefore, the power supply unit PWU does not start in an appropriate manner. As a result, the liquid crystal panel PNL may flicker.

The cellular phone in FIG. 1 comprises the body section HB and the display section DB and is foldable at the hinge HNG. Though not shown, there may be another type of cellular phone whose main display can swivel 180 degrees. Such cellular phone also comprises the body section HB and the display section DB and is rotatable at a connecting section. The cellular phone in FIG. 1 stands by when closed, and becomes usable when opened. The cellular phone detects an open/close action or a revolution. Based on the detected information, the microprocessor unit MPU writes setup information for turning on or off the liquid crystal panel PNL to the instruction register ISR, the registers in the power supply sequencer PSC, and the like. Then, the microprocessor unit MPU uses the power supply sequencer PSC.

Further, the cellular phone detects a press of an operation key on the body section HB for turning on or off the cellular phone. Based on the detected information, the microprocessor unit MPU writes setup information for turning on or off the liquid crystal panel PNL to the instruction register ISR, the registers in the power supply sequencer PSC, and the like. Then, the microprocessor unit MPU uses the power supply sequencer PSC.

As mentioned above, the present invention can provide a display drive control device and a drive method thereof capable of easily changing a power supply startup procedure, complying with various display devices, and decreasing system loads by changing a procedure of generating voltages through the use of a sequence independent of the system control.

What is claimed is:

1. A display drive control device comprising:
   a power supply circuit which generates a plurality of voltages for displaying an image on a display device having a plurality of pixels; and
   a power supply sequencer which operates based on a plurality of first registers in which a plurality of setting values for controlling said power supply circuit are set,
   wherein said power supply sequencer controls said power supply circuit based on a setting value set to each register containing said plurality of first registers and outputs a signal for time control of said plurality of voltages based on predetermined time.

2. The display drive control device according to claim 1, wherein said display device is a liquid crystal display panel comprising:
   a plurality of source electrode wirings which extend along one direction and are disposed along another direction crossing said direction;
   a plurality of gate electrode wirings which extend along said another direction and are disposed along said one direction;
   a pixel circuit having an active element which is provided at each crossing of said source electrode wiring and said gate electrode wiring and is coupled to said source electrode wiring and said gate electrode wiring;
   a pixel electrode driven by said pixel circuit; and
   a common electrode wiring coupled to a common electrode provided for said pixel electrode via liquid crystal; and
   wherein said display drive control device is a liquid crystal drive controller which controls image display on said liquid crystal display panel.

3. The display drive control device according to claim 2, wherein said liquid crystal drive controller comprises:
   a source driver which supplies display data to said source electrode wiring based on a first one of said plurality of voltages supplied from said power supply circuit;
   a gate driver which supplies a scan voltage to said gate electrode wiring based on a second one of said plurality of voltages supplied from said power supply circuit;
   a common electrode driver which supplies a common voltage to said common electrode wiring based on a third one of said plurality of voltages supplied from said power supply circuit; and
   a driver control circuit which controls said source driver, said gate driver, and said common electrode driver, and generates signals synchronized with outputs from said drivers.

4. The display drive control device according to claim 3, wherein said power supply circuit comprises:
   a reference voltage generation circuit which generates a reference voltage based on a voltage supplied from main power supply;
   a booster circuit which boosts said reference voltage to a specified voltage;
   a gradation voltage generation circuit which generates a display data voltage supplied to said source electrode wiring based on a first boost voltage boosted by said booster circuit;
   a gate voltage generation circuit which generates a scan voltage supplied to said gate electrode wiring based on a second boost voltage boosted by said booster circuit; and
   a common voltage generation circuit which generates a common voltage supplied to said common electrode wiring based on a third boost voltage boosted by said booster circuit.

5. The display drive control device according to claim 4, wherein said plurality of first registers constituting said power supply sequencer comprise:
   a second register to register a setting value for setting an operation of said booster circuit;
   a third register to register a setting value for setting an operation of said gradation voltage generation circuit;
   a fourth register to register a setting value for setting an operation of said power supply circuit; and
   a fifth register to register a setting value for setting an operation of said common voltage generation circuit.

6. The display drive control device according to claim 1, comprising:
   first setup means for determining whether or not to use said power supply sequencer; and
   second setup means for starting and stopping sequence control of said power supply sequencer,
   wherein said display drive control device is fabricated over one semiconductor substrate.

7. The display drive control device according to claim 6, comprising:
   third setup means for setting a timing to validate setting values registered to said plurality of first registers.

8. The display drive control device according to claim 7, comprising:
   a plurality of second registers to set timing for validating setting values registered to said plurality of first registers.

9. The display drive control device according to claim 8, comprising:
   a plurality of third registers to set a power supply state before validation of setting values registered to said plurality of first registers; and
   a fourth register to determine whether or not to provide a plurality of registers constituting said plurality of third registers with setting values registered to said plurality of first registers.

10. The display drive control device according to claim 8, wherein said power supply sequencer comprises:
    a frame counter to count frame frequencies of said display device so as to set a timing to validate setting values registered to said plurality of first registers;
    a comparator to compare setting values registered to said plurality of second registers with a count value in said frame counter; and
    selection means for selecting any of setting values registered to said plurality of first registers and setting values registered to a plurality of registers constituting said plurality of third registers based on comparison outputs from said comparator.

11. The display drive control device according to claim 8, comprising:
a fifth register to register a setting value for determining whether or not to use said power supply sequencer;
a sixth register to register a setting value for determining whether or not to perform an operation of said power supply sequencer; and
a seventh register to register a setting value for determining a termination time for an operation of said power supply sequencer.

12. The display drive control device according to claim 8, wherein said display drive control device includes a driver control circuit,
wherein said driver control circuit includes said power supply sequencer, and
wherein said power supply control circuit controls said display drive control device and, based on a setting value registered to each register, generates a signal to generate said plurality of voltages in a time-sharing manner by controlling said power supply sequencer and said power supply circuit.

13. The display drive control device according to claim 5,
wherein said second register is capable of setting a booster magnification, a booster clock division ratio, and an operating/nonoperating state of said booster circuit,
wherein said third register is capable of setting an on/off-state of said gradation voltage generation circuit,
wherein said fourth register is capable of setting an on/off-state of said power supply circuit and the amount of current flowing through said power supply circuit, and
wherein said fifth register is capable of setting an on/off-state of said common voltage generation circuit.

14. The display drive control device according to claim 13,
wherein said liquid crystal drive controller includes a driver control circuit,
wherein said driver control circuit includes said power supply sequencer,
wherein said driver control circuit controls said liquid crystal drive controller and, based on a setting value registered to each register, generates a signal to generate said plurality of voltages in a time-sharing manner by controlling said power supply sequencer and said power supply circuit, and
wherein said driver control circuit comprises:
an interface circuit to incorporate data from an outside;
graphics RAM to store display data;
an instruction register provided between said interface circuit and said power supply sequencer; and
a timing generation circuit to generate a timing signal as a reference of operations of said display drive control device.

15. A drive method of a display drive control device, said display drive control device comprising:
a power supply circuit to generate a plurality of voltages for displaying an image on a display device comprising a plurality of pixels in a matrix;
a plurality of first registers to register a plurality of setting values for controlling said power supply circuit;
a power supply sequencer to provide time control for said power supply circuit based on setting values registered to said plurality of first registers;
an interface circuit to interchange data with an outside; and
an instruction register provided between said interface circuit and said power supply sequencer,
said display drive control device being supplied with power from a main power supply,
wherein said drive method of said display drive control device is constituted such that after said main power supply stops supplying power, and then restarts supplying power, setting values for turning off said display device are registered to registers in said power supply sequencer and to said instruction register.

16. The drive method of the display drive control device according to claim 15,
wherein said display device is a liquid crystal display device, comprising:
many source electrode wirings which extend along one direction and are disposed along another direction crossing said direction;
many gate electrode wirings which extend along said another direction and are disposed along said one direction;
a pixel circuit having an active element which is provided at each crossing of said source electrode wiring and said gate electrode wiring and is coupled to said source electrode wiring and said gate electrode wiring;
a pixel electrode driven by said pixel circuit; and
a common electrode wiring coupled to a common electrode provided for said pixel electrode via liquid crystal;
wherein said display device comprises:
a source driver which supplies display data to said source electrode wiring based on a first one of said plurality of voltages supplied from said power supply circuit;
a gate driver which supplies a scan voltage to said gate electrode wiring based on a second one of said plurality of voltages supplied from said power supply circuit;
a common electrode driver which supplies a common voltage to said common electrode wiring based on a third one of said plurality of voltages supplied from said power supply circuit; and
a driver control circuit which controls operations of said drivers,
wherein said driver control circuit controls said source driver, said gate driver, and said common electrode driver, and generates signals synchronized with outputs from said drivers.

17. The drive method of the display drive control device according to claim 16,
wherein said power supply circuit comprises:
a reference voltage generation circuit which generates a reference voltage based on a voltage supplied from said main power supply;
a booster circuit which boosts said reference voltage to a specified voltage;
a gradation voltage generation circuit which generates a display data voltage supplied to said source electrode wiring based on a first boost voltage boosted by said booster circuit;
a gate voltage generation circuit which generates a scan voltage supplied to said gate electrode wiring based on a second boost voltage boosted by said booster circuit; and
a common voltage generation circuit which generates a common voltage supplied to said common electrode wiring based on a third boost voltage boosted by said booster circuit, wherein said power supply sequencer comprises first, second, third, and fourth registers, wherein said first register registers a setting value for starting said booster circuit, wherein said second register registers a setting value for starting said gradation voltage generation circuit, wherein said third register registers a setting value for starting said power supply circuit, and wherein said fourth register registers a setting value for starting said common voltage generation circuit.

18. The drive method of the display drive control device according to claim 17, wherein said power supply sequencer comprises first and second setup means, wherein said first setup means determines whether or not to use said power supply sequencer, and wherein said second setup means starts and stops sequence control of said power supply sequencer.

19. The drive method of the display drive control device according to claim 18, wherein said power supply sequencer has third setup means, and wherein a timing to validate setting values registered to a plurality of registers constituting said power supply sequencer is set in said third setup means.

20. The drive method of the display drive control device according to claim 19, wherein said power supply sequencer has fifth, sixth, and seventh registers each of which comprises a plurality of registers, wherein said fifth register registers a power supply state before validation of setting values registered to said plurality of registers, wherein said sixth register registers a timing to validate setting values registered to a plurality of registers constituting said first through fourth registers, and wherein said seventh register specifies whether or not to register said previous power supply state to a plurality of registers constituting said fifth register.

21. The drive method of the display drive control device according to claim 20, wherein said power supply sequencer has a frame counter, comparison means, and selection means, wherein said frame counter counts a frame frequency on said liquid crystal display panel so as to set a timing to validate setting values registered to a plurality of registers constituting said first through fourth registers, wherein said comparator compares setting values registered to a plurality of registers constituting said sixth register with a count value in said frame counter, and wherein said selection means selects any of setting values registered to a plurality of registers constituting said first through fourth registers and setting values registered to a plurality of registers constituting said fifth based on comparison outputs from said comparator.

22. The drive method of the display drive control device according to claim 17, comprising the steps of:

setting a booster magnification, a booster clock division ratio, and an operating/nonoperating state of said booster circuit to said first register;

setting an on/off-state of said gradation voltage generation circuit to said second register;

setting an on/off-state of said power supply circuit and the amount of current flowing through said power supply circuit to said third register; and setting an on/off-state of said common voltage generation circuit to said fourth register.

23. An electronic device comprising a display drive control device and a central processing unit, wherein said display drive control device comprises:

a display panel comprising a plurality of pixels disposed in a matrix;

a power supply circuit to generate a plurality of voltages for displaying an image on said display panel;

a plurality of first registers to register a plurality of setting values for controlling said power supply circuit;

a power supply sequencer to provide time control for said power supply circuit based on setting values registered to said plurality of first registers;

an interface circuit to interchange data with an outside; and an instruction register provided between said central processing unit interface circuit and said power supply sequencer, wherein said central processing unit controls said display drive control device.

24. The electronic device according to claim 23, wherein said electronic device is a cellular phone, and wherein said cellular phone comprises:

an audio interface to allow input and output of audio data to and from a microphone and a speaker;

a high frequency interface to allow input and output of signals to and from an antenna;

nonvolatile memory to store a control program and control data for said cellular phone; and volatile memory to exchange data with said central processing unit and store and output said data.

25. The electronic device according to claim 24, wherein said cellular phone uses said power supply sequencer when said cellular phone changes from a stand-by state to an operating state, and when said cellular phone changes from a power-off state to a power-on state.

* * * * *